US011775835B2

(12) United States Patent
Lee et al.

(10) Patent No.: US 11,775,835 B2
(45) Date of Patent: *Oct. 3, 2023

(54) ROOM LAYOUT ESTIMATION METHODS AND TECHNIQUES

(71) Applicant: Magic Leap, Inc., Plantation, FL (US)

(72) Inventors: Chen-Yu Lee, Sunnyvale, CA (US); Vijay Badrinarayanan, Mountain View, CA (US); Tomasz Jan Malisiewicz, Mountain View, CA (US); Andrew Rabinovich, San Francisco, CA (US)

(73) Assignee: MAGIC LEAP, INC., Plantation, FL (US)

( * ) Notice: Subject to any disclaimer, the term of this patent is extended or adjusted under 35 U.S.C. 154(b) by 543 days.

This patent is subject to a terminal disclaimer.

(21) Appl. No.: 16/844,812

(22) Filed: Apr. 9, 2020

(65) Prior Publication Data

US 2020/0234051 A1    Jul. 23, 2020

Related U.S. Application Data

(63) Continuation of application No. 15/923,511, filed on Mar. 16, 2018, now Pat. No. 10,657,376.

(Continued)

(51) Int. Cl.
*G06N 3/084* (2023.01)
*G06N 3/04* (2023.01)
(Continued)

(52) U.S. Cl.
CPC .......... *G06N 3/084* (2013.01); *G06F 18/214* (2023.01); *G06F 18/2413* (2023.01); *G06N 3/04* (2013.01);
(Continued)

(58) Field of Classification Search
None
See application file for complete search history.

(56) References Cited

U.S. PATENT DOCUMENTS 5,291,560 A    3/1994  Daugman
5,583,795 A   12/1996  Smyth
(Continued)

FOREIGN PATENT DOCUMENTS

CN     106471525 A    3/2017
JP     2014-220804   11/2014
(Continued)

OTHER PUBLICATIONS

Zhang et al ("Learning to Predict High-Quality Edge Maps for Room Layout Estimation"), IEEE Transactions on Multimedia (vol. 19, Issue:5), IEEE, Date of Publication: Dec. 21, 2016.*
(Continued)

*Primary Examiner* — Chan S Park
*Assistant Examiner* — Elisa M Rice
(74) *Attorney, Agent, or Firm* — SEED IP LAW GROUP LLP

(57) ABSTRACT

Systems and methods for estimating a layout of a room are disclosed. The room layout can comprise the location of a floor, one or more walls, and a ceiling. In one aspect, a neural network can analyze an image of a portion of a room to determine the room layout. The neural network can comprise a convolutional neural network having an encoder sub-network, a decoder sub-network, and a side sub-network. The neural network can determine a three-dimensional room layout using two-dimensional ordered keypoints associated with a room type. The room layout can be used in applications such as augmented or mixed reality, robotics, autonomous indoor navigation, etc.

24 Claims, 16 Drawing Sheets

Related U.S. Application Data

(60) Provisional application No. 62/473,257, filed on Mar. 17, 2017.

(51) Int. Cl.

| | | |
|---|---|---|
| *G06V 20/00* | (2022.01) | |
| *G06V 10/44* | (2022.01) | |
| *G06V 10/94* | (2022.01) | |
| *G06V 20/20* | (2022.01) | |
| *G06F 18/214* | (2023.01) | |
| *G06F 18/2413* | (2023.01) | |
| *G06N 3/044* | (2023.01) | |
| *G06N 3/045* | (2023.01) | |
| *G06V 10/764* | (2022.01) | |
| *G06V 10/774* | (2022.01) | |
| *G06V 10/82* | (2022.01) | |
| *G06N 3/082* | (2023.01) | |

(52) U.S. Cl.
CPC ............ *G06N 3/044* (2023.01); *G06N 3/045* (2023.01); *G06V 10/44* (2022.01); *G06V 10/454* (2022.01); *G06V 10/764* (2022.01); *G06V 10/774* (2022.01); *G06V 10/82* (2022.01); *G06V 10/95* (2022.01); *G06V 20/20* (2022.01); *G06V 20/36* (2022.01); *G06N 3/082* (2013.01)

(56) References Cited

U.S. PATENT DOCUMENTS

| | | | |
|---|---|---|---|
| 6,850,221 | B1 | 2/2005 | Tickle |
| 7,771,049 | B2 | 8/2010 | Knaan et al. |
| 7,970,179 | B2 | 6/2011 | Tosa |
| 8,098,891 | B2 | 1/2012 | Lv et al. |
| 8,341,100 | B2 | 12/2012 | Miller et al. |
| 8,345,984 | B2 | 1/2013 | Ji et al. |
| 8,363,783 | B2 | 1/2013 | Gertner et al. |
| 8,845,625 | B2 | 9/2014 | Angeley et al. |
| 8,950,867 | B2 | 2/2015 | Macnamara |
| 9,081,426 | B2 | 7/2015 | Armstrong |
| 9,141,916 | B1 | 9/2015 | Corrado et al. |
| 9,215,293 | B2 | 12/2015 | Miller |
| 9,262,680 | B2 | 2/2016 | Nakazawa et al. |
| 9,310,559 | B2 | 4/2016 | Macnamara |
| 9,348,143 | B2 | 5/2016 | Gao et al. |
| D758,367 | S | 6/2016 | Natsume |
| 9,417,452 | B2 | 8/2016 | Schowengerdt et al. |
| 9,430,829 | B2 | 8/2016 | Madabhushi et al. |
| 9,470,906 | B2 | 10/2016 | Kaji et al. |
| 9,547,174 | B2 | 1/2017 | Gao et al. |
| 9,671,566 | B2 | 6/2017 | Abovitz et al. |
| 9,740,006 | B2 | 8/2017 | Gao |
| 9,791,700 | B2 | 10/2017 | Schowengerdt et al. |
| 9,851,563 | B2 | 12/2017 | Gao et al. |
| 9,857,591 | B2 | 1/2018 | Welch et al. |
| 9,874,749 | B2 | 1/2018 | Bradski et al. |
| 10,657,376 | B2 * | 5/2020 | Lee .................... G06N 3/0445 |
| 2004/0130680 | A1 | 7/2004 | Zhou et al. |
| 2006/0028436 | A1 | 2/2006 | Armstrong |
| 2006/0088193 | A1 | 4/2006 | Muller et al. |
| 2006/0147094 | A1 | 7/2006 | Yoo |
| 2007/0081123 | A1 | 4/2007 | Lewis |
| 2007/0140531 | A1 | 6/2007 | Hamza |
| 2011/0182469 | A1 | 7/2011 | Ji et al. |
| 2012/0127062 | A1 | 5/2012 | Bar-Zeev et al. |
| 2012/0162549 | A1 | 6/2012 | Gao et al. |
| 2012/0163678 | A1 | 6/2012 | Du et al. |
| 2013/0082922 | A1 | 4/2013 | Miller |
| 2013/0117377 | A1 | 5/2013 | Miller |
| 2013/0125027 | A1 | 5/2013 | Abovitz |
| 2013/0208234 | A1 | 8/2013 | Lewis |
| 2013/0242262 | A1 | 9/2013 | Lewis |
| 2014/0071539 | A1 | 3/2014 | Gao |
| 2014/0177023 | A1 | 6/2014 | Gao et al. |
| 2014/0218468 | A1 | 8/2014 | Gao et al. |
| 2014/0267420 | A1 | 9/2014 | Schowengerdt |
| 2014/0270405 | A1 | 9/2014 | Derakhshani et al. |
| 2014/0279774 | A1 | 9/2014 | Wang et al. |
| 2014/0306866 | A1 | 10/2014 | Miller et al. |
| 2014/0380249 | A1 | 12/2014 | Fleizach |
| 2015/0016777 | A1 | 1/2015 | Abovitz et al. |
| 2015/0103306 | A1 | 4/2015 | Kaji et al. |
| 2015/0117760 | A1 | 4/2015 | Wang et al. |
| 2015/0125049 | A1 | 5/2015 | Taigman et al. |
| 2015/0134583 | A1 | 5/2015 | Tamatsu et al. |
| 2015/0170002 | A1 | 6/2015 | Szegedy et al. |
| 2015/0178939 | A1 | 6/2015 | Bradski et al. |
| 2015/0205126 | A1 | 7/2015 | Schowengerdt |
| 2015/0222883 | A1 | 8/2015 | Welch |
| 2015/0222884 | A1 | 8/2015 | Cheng |
| 2015/0268415 | A1 | 9/2015 | Schowengerdt et al. |
| 2015/0278642 | A1 | 10/2015 | Chertok et al. |
| 2015/0302652 | A1 | 10/2015 | Miller et al. |
| 2015/0309263 | A2 | 10/2015 | Abovitz et al. |
| 2015/0326570 | A1 | 11/2015 | Publicover et al. |
| 2015/0338915 | A1 | 11/2015 | Publicover et al. |
| 2015/0346490 | A1 | 12/2015 | TeKolste et al. |
| 2015/0346495 | A1 | 12/2015 | Welch et al. |
| 2016/0011419 | A1 | 1/2016 | Gao |
| 2016/0026253 | A1 * | 1/2016 | Bradski ................ H04N 13/128 |
| | | | 345/8 |
| 2016/0034811 | A1 | 2/2016 | Paulik et al. |
| 2016/0035078 | A1 | 2/2016 | Lin et al. |
| 2016/0098844 | A1 | 4/2016 | Shaji et al. |
| 2016/0104053 | A1 | 4/2016 | Yin et al. |
| 2016/0104056 | A1 | 4/2016 | He et al. |
| 2016/0135675 | A1 | 5/2016 | Du et al. |
| 2016/0162782 | A1 | 6/2016 | Park |
| 2016/0189027 | A1 | 6/2016 | Graves et al. |
| 2016/0335795 | A1 | 11/2016 | Flynn et al. |
| 2017/0053165 | A1 | 2/2017 | Kaehler |
| 2017/0061330 | A1 | 3/2017 | Kurata |
| 2017/0061625 | A1 | 3/2017 | Estrada et al. |
| 2018/0018451 | A1 | 1/2018 | Spizhevoy et al. |
| 2018/0018515 | A1 | 1/2018 | Spizhevoy et al. |
| 2018/0089834 | A1 | 3/2018 | Spizhevoy et al. |
| 2018/0096226 | A1 | 4/2018 | Aliabadi et al. |
| 2018/0137642 | A1 | 5/2018 | Malisiewicz |
| 2018/0268220 | A1 | 9/2018 | Lee |

FOREIGN PATENT DOCUMENTS

| | | |
|---|---|---|
| WO | WO 2014/182769 | 11/2014 |
| WO | WO 2015/164807 | 10/2015 |
| WO | WO 2016/106238 | 6/2016 |
| WO | WO 2018/013200 | 1/2018 |
| WO | WO 2018/039269 | 3/2018 |
| WO | WO 2018/063451 | 4/2018 |
| WO | WO 2018/067603 | 4/2018 |
| WO | WO 2018/170421 | 9/2018 |

OTHER PUBLICATIONS

Izadinia et al. ("Incorporating Scene Context and Object Layout into Appearance Modeling"), Published In: 2014 IEEE Conference on Computer Vision and Pattern Recognition, IEEE, 2014.*

Chen-Yu, et al., "RoomNet: End-to-End Room Layout Estimation," arxiv.org, Cornell University Library. Mar. 1, 2017.

Yang et al., "Real-Time 3D Scene Layout From A Single Image Using Convolutional Neural Networks," 2016 IEEE International Conference on Robotics and Automation (ICRA) Stockholm, Sweden. May 16-21, 2016.

"Camera Calibration and 3D Reconstruction", OpenCV, retrieved May 5, 2016, from <http://docs.opencv.org/2.4/modules/calib3d/doc/camera_calibration_and_3d_reconstruction.html> in 53 pages.

"Camera calibration with OpenCV", OpenCV, retrieved May 5, 2016, in 12 pages. URL: http://docs.opencv.org/2.4/doc/tutorials/calib3d/camera_calibration/camera_calibration.html.

(56) References Cited

OTHER PUBLICATIONS

"Camera calibration with OpenCV", OpenCV, retrieved May 5, 2016, in 7 pages. URL: http://docs.opencv.org/3.1.0/d4/d94/tutorial_camera_calibration.html#gsc.tab=0.
"Convolution", Wikipedia, accessed Oct. 1, 2017, in 17 pages. URL: https://en.wikipedia.org/wiki/Convolution.
"Deep Learning", Wikipedia, printed Oct. 3, 2017, in 23 pages. URL: https://en.wikipedia.org/wiki/Deep_learning.
"Feature Extraction Using Convolution", Ufldl, printed Sep. 1, 2016, in 3 pages. URL:http://deeplearning.stanford.edu/wiki/index.php/Feature_extraction_using_convolution.
"Machine Learning", Wikipedia, printed Oct. 3, 2017, in 14 pages. URL: https://en.wikipedia.org/wiki/Machine_learning.
"Transfer Function Layers", GitHub, Dec. 1, 2015, in 13 pages; accessed URL: http://github.com/torch/nn/blob/master/doc/transfer.md.
Adegoke et al., "Iris Segmentation: A Survey", Int J Mod Engineer Res. (IJMER) (Aug. 2013) 3(4): 1885-1889.
Anthony, S., "MIT releases open-source software that reveals invisible motion and detail in video", Extreme Tech, Feb. 28, 2013, as archived Aug. 4, 2017, in 5 pages.
Arevalo J. et al., "Convolutional neural networks for mammography mass lesion classification", in *Engineering in Medicine and Biology Society* (EMBC); 37th Annual International Conference IEEE, Aug. 25-29, 2015, pp. 797-800.
Aubry M. et al., "Seeing 3D chairs: e emplar part-based 2D-3D alignment using a large dataset of CAD models", Proceedings of the IEEE Conference on Computer Vision and Pattern Recognition (Jun. 23-28, 2014); Computer Vision Foundation—Open Access Version in 8 pages.
Badrinarayanan et al., "SegNet: A Deep Convolutional Encoder-Decoder Architecture for Image Segmentation", IEEE (Dec. 8, 2015); arXiv: eprint arXiv:1511.00561v2 in 14 pages.
Badrinarayanan et al., "SegNet: A Deep Convolutional Encoder-Decoder Architecture for Image Segmentation", TPAMI, vol. 39, No. 12, Dec. 2017.
Bansal A. et al., "Marr Revisited: 2D-3D Alignment via Surface Normal Prediction", Proceedings of the IEEE Conference on Computer Vision and Pattern Recognition (Jun. 27-30, 2016) pp. 5965-5974.
Belagiannis V. et al., "Recurrent Human Pose Estimation", In Automatic Face & Gesture Recognition; 12th IEEE International Conference—May 2017, arXiv eprint arXiv:1605.02914v3; (Aug. 5, 2017) Open Access Version in 8 pages.
Bell S. et al., "Inside-Outside Net: Detecting Objects in Conte t with Skip Pooling and Recurrent Neural Networks", In Proceedings of the IEEE Conference on Computer Vision and Pattern Recognition, Jun. 27-30, 2016; pp. 2874-2883.
Biederman I., "Recognition-by-Components: A Theory of Human Image Understanding", Psychol Rev. (Apr. 1987) 94(2): 115-147.
Bouget, J., "Camera Calibration Toolbox for Matlab" Cal-Tech, Dec. 2, 2013, in 5 pages. URL: https://www.vision.caltech.edu/bouguetj/calib_doc/index.html#parameters.
Bulat A. et al., "Human pose estimation via Convolutional Part Heatmap Regression", arXiv e-print arXiv:1609.01743v1, Sep. 6, 2016 in 16 pages.
Carreira J. et al., "Human Pose Estimation with Iterative Error Feedback", In Proceedings of the IEEE Conference on Computer Vision and Pattern Recognition, Jun. 27-30, 2016, pp. 4733-4742.
Chatfield et al., "Return of the Devil in the Details: Delving Deep into Convolutional Nets", arXiv eprint arXiv:1405.3531v4, Nov. 5, 2014 in 11 pages.
Chen et al., "Semantic Image Segmentation With Deep Convolutional Nets and Fully Connected CRFs," In ICLR, arXiv:1412.7062v3 [cs.CV] Apr. 9, 2015.
Chen X. et al., "3D Object Proposals for Accurate Object Class Detection", in *Advances in Neural Information Processing Systems*, (2015) Retrieved from <http://papers.nips.cc/paper/5644-3d-object-proposals-for-accurate-obiect-class-detection.pdf>; 11 pages.

Choy et al., "3D-R2N2: A Unified Approach for Single and Multi-view 3D Object Reconstruction", arXiv; eprint arXiv:1604.00449v1, Apr. 2, 2016 in 17 pages.
Collet et al., "The MOPED framework: Object Recognition and Pose Estimation for Manipulation", The International Journal of Robotics Research. (Sep. 2011) 30(10):1284-306; preprint Apr. 11, 2011 in 22 pages.
Coughlan et al., "The Manhattan World Assumption: Regularities in scene statistics which enable bayesian inference," In NIPS, 2000.
Crivellaro A. et al., "A Novel Representation of Parts for Accurate 3D Object Detection and Tracking in Monocular Images", In *Proceedings of the IEEE International Conference on Computer Vision*; Dec. 7-13, 2015 (pp. 4391-4399).
Dai J. et al., "Instance-aware Semantic Segmentation via Multi-task Network Cascades", In *Proceedings of the IEEE Conference on Computer Vision and Pattern Recognition*; Jun. 27-30, 2016 (pp. 3150-3158).
Dai J. et al., "R-FCN: Object Detection via Region-based Fully Convolutional Networks", in *Advances in neural information processing systems*; (Jun. 21, 2016) Retrieved from <https://arxiv.org/pdf/1605.06409.pdf in 11 pages.
Dasgupta et al., "Delay: Robust Spatial Layout Estimation for Cluttered Indoor Scenes," In CVPR, 2016.
Daugman, J. et al., "Epigenetic randomness, complexity and singularity of human iris patterns", Proceedings of Royal Society: Biological Sciences, vol. 268, Aug. 22, 2001, in 4 pages.
Daugman, J., "How Iris Recognition Works", IEEE Transactions on Circuits and Systems for Video Technology, vol. 14, No. 1, Jan. 2004, in 10 pages.
Daugman, J., "New Methods in Iris Recognition," IEEE Transactions on Systems, Man, and Cybernetics—Part B: Cybernetics, vol. 37, No. 5, Oct. 2007, in 9 pages.
Daugman, J., "Probing the Uniqueness and Randomness of IrisCodes: Results From 200 Billion Iris Pair Comparisons," Proceedings of the IEEE, vol. 94, No. 11, Nov. 2006, in 9 pages.
Del Pero et al., "Bayesian geometric modeling of indoor scenes," In CVPR, 2012.
Del Pero et al., "Understanding bayesian rooms using composite 3d object models," In CVPR, 2013.
Detone D. et al., "Deep Image Homography Estimation", arXiv eprint arXiv:1606.03798v1, Jun. 13, 2016 in 6 pages.
Dwibedi et al., "Deep Cuboid Detection: Beyond 2D Bounding Boxes", arXiv eprint arXiv:1611.10010v1; Nov. 30, 2016 in 11 pages.
Everingham M. et al., "The PASCAL Visual Object Classes (VOC) Challenge", Int J Comput Vis (Jun. 2010) 88(2):303-38.
Farabet, C. et al., "Hardware Accelerated Convolutional Neural Networks for Synthetic Vision Systems", Proceedings of the 2010 IEEE International Symposium (May 30-Jun. 2, 2010) Circuits and Systems (ISCAS), pp. 257-260.
Fidler S. et al., "3D Object Detection and Viewpoint Estimation with a Deformable 3D Cuboid Model", Proceedings of the 25th International Conference on Neural Information Processing Systems, (Dec. 3-6, 2012), pp. 611-619.
Fouhey D. et al., "Data-Driven 3D Primitives for Single Image Understanding", Proceedings of the IEEE International Conference on Computer Vision, Dec. 1-8, 2013; pp. 3392-3399.
Geiger A. et al., "Joint 3D Estimation of Objects and Scene Layout", In Advances in Neural Information Processing Systems 24; Dec. 17, 2011 in 9 pages.
Gidaris S. et al., "Object detection via a multi-region & semantic segmentation-aware CNN model", in Proceedings of the IEEE International Conference on Computer Vision; Dec. 7-13, 2015 (pp. 1134-1142).
Girshick R. et al., "Fast R-CNN", Proceedings of the IEEE International Conference on Computer Vision; Dec. 7-13, 2015 (pp. 1440-1448).
Girshick R. et al., "Rich feature hierarchies for accurate object detection and semantic segmentation", Proceedings of the IEEE Conference on Computer Vision and Pattern Recognition, Jun. 23-28, 2014 (pp. 580-587).

(56) References Cited

OTHER PUBLICATIONS

Gupta A. et al., "Blocks World Revisited: Image Understanding Using Qualitative Geometry and Mechanics", in European Conference on Computer Vision; Sep. 5, 2010 in 14 pages.
Gupta A. et al., "From 3D Scene Geometry to Human Workspace", in Computer Vision and Pattern Recognition (CVPR); IEEE Conference on Jun. 20-25, 2011 (pp. 1961-1968).
Gupta et al., "Perceptual Organization and Recognition of Indoor Scenes from RGB-D Images," In CVPR, 2013.
Gupta S. et al., "Aligning 3D Models to RGB-D Images of Cluttered Scenes", in Proceedings of the IEEE Conference on Computer Vision and Pattern Recognition, Jun. 7-12, 2015 (pp. 4731-4740).
Gupta S. et al., "Inferring 3D Object Pose in RGB-D Images", arXiv e-print arXiv:1502.04652v1, Feb. 16, 2015 in 13 pages.
Gupta S. et al., "Learning Rich Features from RGB-D Images for Object Detection and Segmentation", in *European Conference on Computer Vision*; (Jul. 22, 2014); Retrieved from <https://arxiv.org/pdf/1407.5736.pdf> in 16 pages.
Han et al., "Deep Compression: Compressing Deep Neural Networks with Pruning, Trained Quantization and Huffman Coding", arXiv eprint arXiv:1510.00149v5, Feb. 15, 2016 in 14 pages.
Hansen, D. et al., "In the Eye of the Beholder: A Survey of Models for Eyes and Gaze", IEEE Transactions on Pattern Analysis and Machine Intelligence, vol. 32, No. 3, , Mar. 2010, in 23 pages.
Hartley R. et al., *Multiple View Geometry in Computer Vision*, 2nd Edition; Cambridge University Press, (Apr. 2004); in 673 pages.
He et al., "Deep Residual Learning for Image Recognition," In CVPR, 2016.
He et al., "Delving Deep into Rectifiers: Surpassing Human-level Performance on ImageNet Classification", arXiv: eprint arXiv:1502.01852v1, Feb. 6, 2015 in 11 pages.
He et al., "Spatial Pyramid Pooling in Deep Convolutional Networks for Visual Recognition", arXiv eprint arXiv:1406.4729v2; Aug. 29, 2014 in 14 pages.
Hedau et al., "Recovering the Spatial Layout of Cluttered Rooms," In ICCV, 2009.
Hedau V. et al., "Recovering Free Space of Indoor Scenes from a Single Image", in *Computer Vision and Pattern Recognition* (CVPR), IEEE Conference Jun. 16-21, 2012 (pp. 2807-2814).
Hejrati et al., "Categorizing Cubes: Revisiting Pose Normalization", Applications of Computer Vision (WACV), 2016 IEEE Winter Conference, Mar. 7-10, 2016 in 9 pages.
Hijazi, S. et al., "Using Convolutional Neural Networks for Image Recognition", Tech Rep. (Sep. 2015) available online URL: http://ip.cadence.com/uploads/901/cnn-wp-pdf, in 12 pages.
Hochreiter et al., "Long Short-Term Memory," Neural computation, 9, 1735-1780, 1997.
Hoffer et al., "Deep Metric Learning Using Triplet Network", International Workshop on Similarity-Based Pattern Recognition [ICLR]; Nov. 25, 2015; [online] retrieved from the internet <https://arxiv.org/abs/1412.6622>; pp. 84-92.
Hoiem D. et al., "Representations and Techniques for 3D Object Recognition and Scene Interpretation", Synthesis Lectures on Arlificial Intelligence and Machine Learning, Aug. 2011, vol. 5, No. 5, pp. 1-169; Abstract in 2 pages.
Hsiao E. et al., "Making specific features less discriminative to improve point-based 3D object recognition", in *Computer Vision and Pattern Recognition* (CVPR), IEEE Conference, Jun. 13-18, 2010 (pp. 2653-2660).
Huang et al., "Sign Language Recognition Using 3D Convolutional Neural Networks", University of Science and Technology of China, 2015 IEEE International Conference on Multimedia and Expo. Jun. 29-Jul. 3, 2015, in 6 pages.
Iandola F. et al., "SqueezeNet: AlexNet-level accuracy with 50x fewer parameters and <1MB model size", arXiv eprint arXiv:1602.07360v1, Feb. 24, 2016 in 5 pages.
Ioffe S. et al., "Batch Normalization: Accelerating Deep Network Training by Reducing Internal Covariate Shift", International Conference on Machine Learning (Jun. 2015); arXiv: eprint arXiv:1502.03167v3, Mar. 2, 2015 in 11 pages.

Izadinia et al., "IM2CAD," arXiv preprint arXiv:1608.05137, 2016.
Jarrett et al., "What is the Best Multi-Stage Architecture for Object Recognition?", In Computer Vision IEEE 12th International Conference Sep. 29-Oct. 2, 2009, pp. 2146-2153.
Ji, H. et al., "3D Convolutional Neural Networks for Human Action Recognition", IEEE Transactions on Pattern Analysis and Machine Intelligence, vol. 35:1, Jan. 2013, in 11 pages.
Jia et al., "3D-Based Reasoning with Blocks, Support, and Stability", Proceedings of the IEEE Conference on Computer Vision and Pattern Recognition; Jun. 23-28, 2013 in 8 pages.
Jia et al., "Caffe: Convolutional Architecture for Fast Feature Embedding", arXiv e-print arXiv:1408.5093v1, Jun. 20, 2014 in 4 pages.
Jiang H. et al., "A Linear Approach to Matching Cuboids in RGBD Images", in *Proceedings of the IEEE Conference on Computer Vision and Pattern Recognition*. Jun. 23-28, 2013 (pp. 2171-2178).
Jillela et al., "An Evaluation of Iris Segmentation Algorithms in Challenging Periocular Images", Handbook of Iris Recognition, Springer Verlag, Heidelberg (Jan. 12, 2013) in 28 pages.
Kar A. et al., "Category-specific object reconstruction from a single image", in *Proceedings of the IEEE Conference on Computer Vision and Pattern Recognition*. Jun. 7-12, 2015 (pp. 1966-1974).
Krizhevsky et al., "ImageNet Classification with Deep Convolutional Neural Networks", Advances in Neural Information Processing Systems. Apr. 25, 2013, pp. 1097-1105.
Lavin, A. et al.: "Fast Algorithms for Convolutional Neural Networks", Proceedings of the IEEE Conference on Computer Vision and Pattern Recognition, arXiv: eprint arXiv:1509.09308v2; Nov. 10, 2016 in 9 pages.
Lee D. et al., "Geometric Reasoning for Single Image Structure Recovery", in IEEE Conference Proceedings in Computer Vision and Pattern Recognition (CVPR) Jun. 20-25, 2009, pp. 2136-2143.
Lee et al., "Deeply-Supervised Nets," In AISTATS, San Diego, CA 2015, JMLR: W&CP vol. 38.
Lee et al., "Estimating Spatial Layout of Rooms using Volumetric Reasoning about Objects and Surfaces," In NIPS, 2010.
Lee et al., "Generalizing Pooling Functions in Convolutional Neural Networks: Mixed, Gated, and Tree," In AISTATS, Gadiz, Spain, JMLR: W&CP vol. 51, 2016.
Lee et al., "Recursive Recurrent Nets with Attention Modeling for OCR in the Wild," In CVPR, 2016.
Liang et al., "Recurrent Convolutional Neural Network for Object Recognition," In CVPR, 2015.
Lim J. et al., "FPM: Fine pose Parts-based Model with 3D CAD models", European Conference on Computer Vision; Springer Publishing, Sep. 6, 2014, pp. 478-493.
Liu et al., "ParseNet: Looking Wider to See Better", arXiv eprint arXiv:1506.04579v1; Jun. 15, 2015 in 9 pages.
Liu et al., "Rent3d: Floor-Plan Priors for Monocular Layout Estimation," In CVPR, 2015.
Liu W. et al., "SSD: Single Shot MultiBox Detector", arXiv e-print arXiv:1512.02325v5, Dec. 29, 2016 in 17 pages.
Long et al., "Fully Convolutional Networks for Semantic Segmentation", Proceedings of the IEEE Conference on Computer Vision and Pattern Recognition (Jun. 7-12, 2015) in 10 pages.
Mallya et al., "Learning Informative Edge Maps for Indoor Scene Layout Prediction," In ICCV, 2015.
Mirowski et al., "Learning to Navigate in Complex Environments," In ICLR, 2017.
Nair et al., "Rectified Linear Units Improve Restricted Boltzmann Machines," In ICML, Haifa, Israel 2010.
Newell et al., "Stacked Hourglass Networks for Human Pose Estimation," In ECCV, ArXiv:1603.06937v2 [cs.CV] 2016.
Noh et al., "Learning Deconvolution Network for Semantic Segmentation," In ICCV, 2015.
Oberweger et al., "Training a Feedback Loop for Hand Pose Estimation," In ICCV, 2015.
Pavlakos G. et al., "6-dof object pose from semantic keypoints", in arXiv preprint Mar. 14, 2017; Retrieved from <http://www.cis.upenn.edu/~kostas/mypub.dir/paviakos17icra.pdf> in 9 pages.
Peng et al., "A Recurrent Encoder-Decoder Network for Seguential Face Alignment," In ECCV, arXiv:1608.05477v2 [cs.CV] 2016.

(56) References Cited

OTHER PUBLICATIONS

Pfister et al., "Flowing Convnets for Human Pose Estimation in Videos," In ICCV, 2015.

Ramalingam et al., "Manhattan Junction Catalogue for Spatial Reasoning of Indoor Scenes." In CVPR, 2013.

Rastegari M. et al., "XNOR-Net: ImageNet Classification Using Binary Convolutional Neural Networks", arXiv eprint arXiv:1603.05279v4; Aug. 2, 2016 in 17 pages.

Redmon J. et al., "You Only Look Once: Unified, Real-Time Object Detection", Proceedings of the IEEE Conference on Computer Vision and Pattern Recognition (Jun. 27-30, 2016) pp. 779-788.

Ren et al., "A Coarse-to-Fine Indoor Layout Estimation (CFILE) Method," In ACCV. arXiv:1607.00598v1 [cs.CV] 2016.

Ren S. et al., "Faster R-CNN: Towards real-time object detection with region proposal networks", arXiv eprint arXiv:1506.01497v3; Jan. 6, 2016 in 14 pages.

Ren, J. et al.: "On Vectorization of Deep Convolutional Neural Networks for Vision Tasks," Association for the Advancement of Artificial Intelligence; arXiv: eprint arXiv:1501.07338v1, Jan. 29, 2015 in 8 pages.

Roberts L. et al., "Machine Perception of Three-Dimensional Solids", Doctoral Thesis MIT; Jun. 1963 in 82 pages.

Rubinstein, M., "Eulerian Video Magnification", YouTube, published May 23, 2012, as archived Sep. 6, 2017, in 13 pages (with video transcription). URL: https://web.archive.org/web/20170906180503/https://www.youtube.com/watch?v=ONZcjs1Pjmk&feature=youtu.be.

Russell et al., "Labelme: a database and web-based tool for image annotation," IJCV, vol. 77, Issue 1-3, pp. 157-173, May 2008.

Savarese S. et al., "3D generic object categorization, localization and pose estimation", in *Computer Vision*, IEEE 11th International Conference; Oct. 14-21, 2007, in 8 pages.

Saxena A., "Convolutional Neural Networks (CNNS): An Illustrated Explanation", Jun. 29, 2016 in 16 pages; Retrieved from <http://xrds.acm.org/blog/2016/06/convolutional-neural-networks-cnns-illustrated-explanation/>.

Schroff et al., "FaceNet: A unified embedding for Face Recognition and Clustering", arXiv eprint arXiv:1503.03832v3, Jun. 17, 2015 in 10 pages.

Schwing et al., "Efficient Structured Prediction for 3D Indoor Scene Understanding," In CVPR, 2012.

Shafiee et al., "ISAAC: A Convolutional Neural Network Accelerator with In-Situ Analog Arithmetic in Crossbars", ACM Sigarch Comp. Architect News (Jun. 2016) 44(3):14-26.

Shao T. et al., "Imagining the Unseen: Stability-based Cuboid Arrangements for Scene Understanding", ACM Transactions on Graphics. (Nov. 2014) 33(6) in 11 pages.

Shi et al., "Convolutional LSTM Network: A Machine Learning Approach for Precipitation Nowcasting," In NIPS, 2015.

Simonyan K. et al., "Very deep convolutional networks for large-scale image recognition", arXiv eprint arXiv:1409.1556v6, Apr. 10, 2015 in 14 pages.

Song S. et al., "Deep Sliding Shapes for Amodal 3D Object Detection in RGB-D Images", Proceedings of the IEEE Conference on Computer Vision and Pattern Recognition. Jun. 27-30, 2016 (pp. 808-816).

Song S. et al., "Sliding Shapes for 3D Object Detection in Depth Images", in European Conference on Computer Vision, (Sep. 6, 2014) Springer Publishing (pp. 634-651).

Song et al., "Sun RGB-D: A RGB-D Scene Understanding Benchmark Suite," In CVPR, 2015.

Su H. et al., "Render for CNN: Viewpoint Estimation in Images Using CNNs Trained with Rendered 3D Model Views", in Proceedings of the IEEE International Conference on Computer Vision, Dec. 7-13, 2015 (pp. 2686-2694).

Szegedy et al., "Going deeper with convolutions", The IEEE Conference on Computer Vision and Pattern Recognition; arXiv, eprint arXiv:1409.4842v1, Sep. 17, 2014 in 12 pages.

Szegedy et al., "Going Deeper with Convolutions," In CVPR, 2015, in 9 pages.

Szegedy et al., "Rethinking the Inception Architecture for Computer Vision", arXiv eprint arXIV:1512.00567v3, Dec. 12, 2015 in 10 pages.

Tompson et al., "Joint Training of a Convolutional Network and a Graphical Model for Human Pose Estimation," In NIPS, 2014.

Tu et al., "Auto-context and Its Application to High-level Vision Tasks," In CVPR, 2008. 978-1-4244-2243-2/08, IEEE.

Tulsiani S. et al., "Viewpoints and Keypoints", Proceedings of the IEEE Conference on Computer Vision and Pattern Recognition; Jun. 7-12, 2015 (pp. 1510-1519).

Villanueva, A. et al., "A Novel Gaze Estimation System with One Calibration Point", IEEE Transactions on Systems, Man, and Cybernetics—Part B:Cybernetics, vol. 38:4, Aug. 2008, in 16 pages.

Wilczkowiak M. et al., "Using Geometric Constraints Through Parallelepipeds for Calibration and 3D Modelling", IEEE Transactions on Pattern Analysis and Machine Intelligence—No. 5055 (Nov. 2003) 27(2) in 53 pages.

Wu J. et al., "Single Image 3D Interpreter Network", European Conference in Computer Vision; arXiv eprint arXiv:1604.08685v2, Oct. 4, 2016 in 18 pages.

Xiang Y. et al., "Data-Driven 3D Voxel Patterns for Object Category Recognition", in Proceedings of the IEEE Conference on Computer Vision and Pattern Recognition, Jun. 7-12, 2015 (pp. 1903-1911).

Xiao J. et al., "Localizing 3D cuboids in single-view images", in Advances in Neural Information Processing Systems; Apr. 25, 2013 in 9 pages.

Xiao et al., "Reconstructing the Worlds Museums," IJCV, 2014.

Xiao et al., "Sun database: Large-scale scene recognition from abbey to zoo," in CVPR, 2010 IEEE Conference on 2010, 3485-3492.

Yang Y. et al., "Articulated human detection with flexible mixtures of parts", IEEE Transactions on Pattern Analysis and Machine Intelligence. Dec. 2013; 35(12):2878-90.

Zhang et al., "Estimating the 3D Layout of Indoor Scenes and its Clutter from Depth Sensors," In ICCV, 2013.

Zhang et al., Large-scale Scene Understanding Challenge: Room Layout Estimation, 2016.

Zhao et al., "Scene Parsing by Integrating Function, Geometry and Appearance Models," In CVPR, 2013.

Zheng et al., "Conditional Random Fields as Recurrent Neural Networks," In CVPR, 2015.

Zheng Y. et al., "Interactive Images: Cuboid Proxies for Smart Image Manipulation", ACM Trans Graph. (Jul. 2012) 31(4):99-109.

International Search Report and Written Opinion for PCT Application No. PCT/US 18/22905, dated Jun. 11, 2018.

International Preliminary Report on Patentability for PCT Application No. PCT/US 18/22905, dated Sep. 17, 2019.

ARToolKit: https://web.archive.org/web/20051013062315/http://www.hitl.washington.edu:80/artoolkit/documentation/hardware.htm, archived Oct. 13, 2005.

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

Izadinia, et al., "Incorporating Scene Context and Object Layout into Appearance Modeling," 2014 IEEE Conference on Computer Vision and Pattern Recognition.

(56) References Cited

OTHER PUBLICATIONS

Kim, et al., "Room Layout Estimation with Object and Material Attributes Information Using a Spherical Camera," 2016 Fourth International Conference on 3D Vision (3DV), 2016, pp. 519-527, doi: 10.1109/3DV.2016.83.

Zhang, et al., "Learning to Predict High-Quality Edge Maps for Room Layout Estimation," IEEE Transactions on Multimedia, vol. 19, No. 5, May 2017.

* cited by examiner

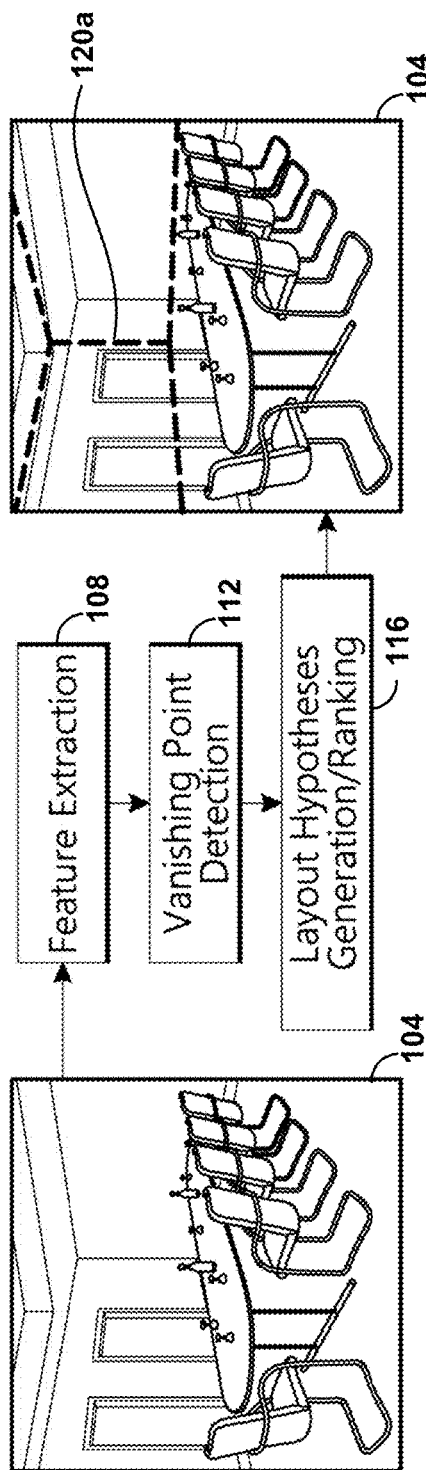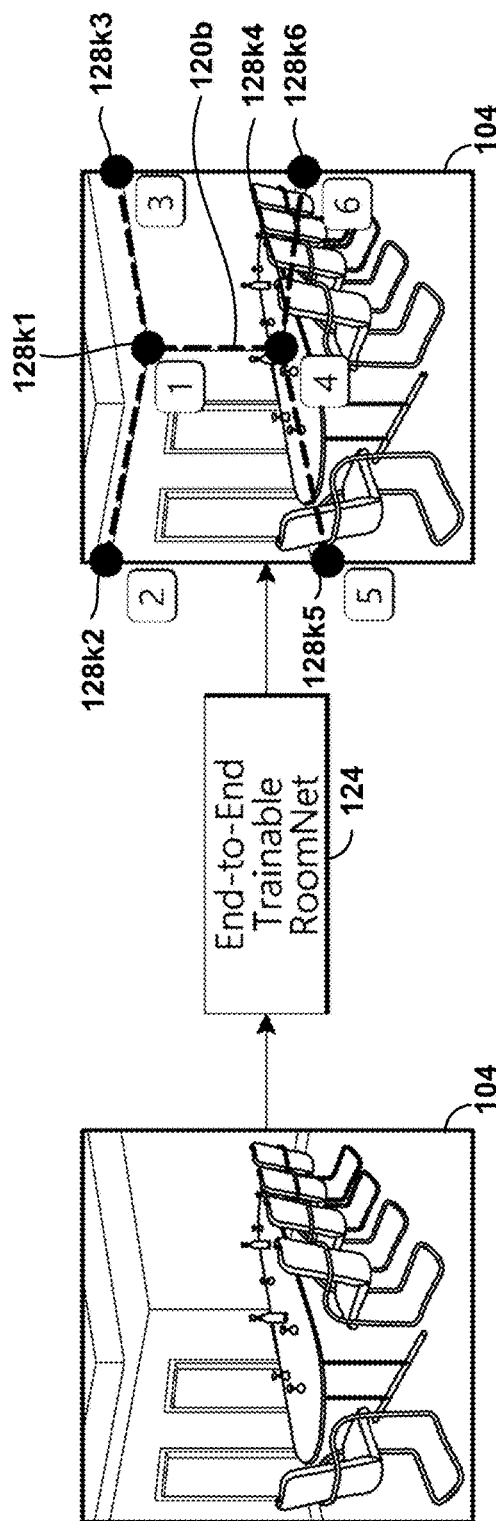
FIG. 1A
FIG. 1B

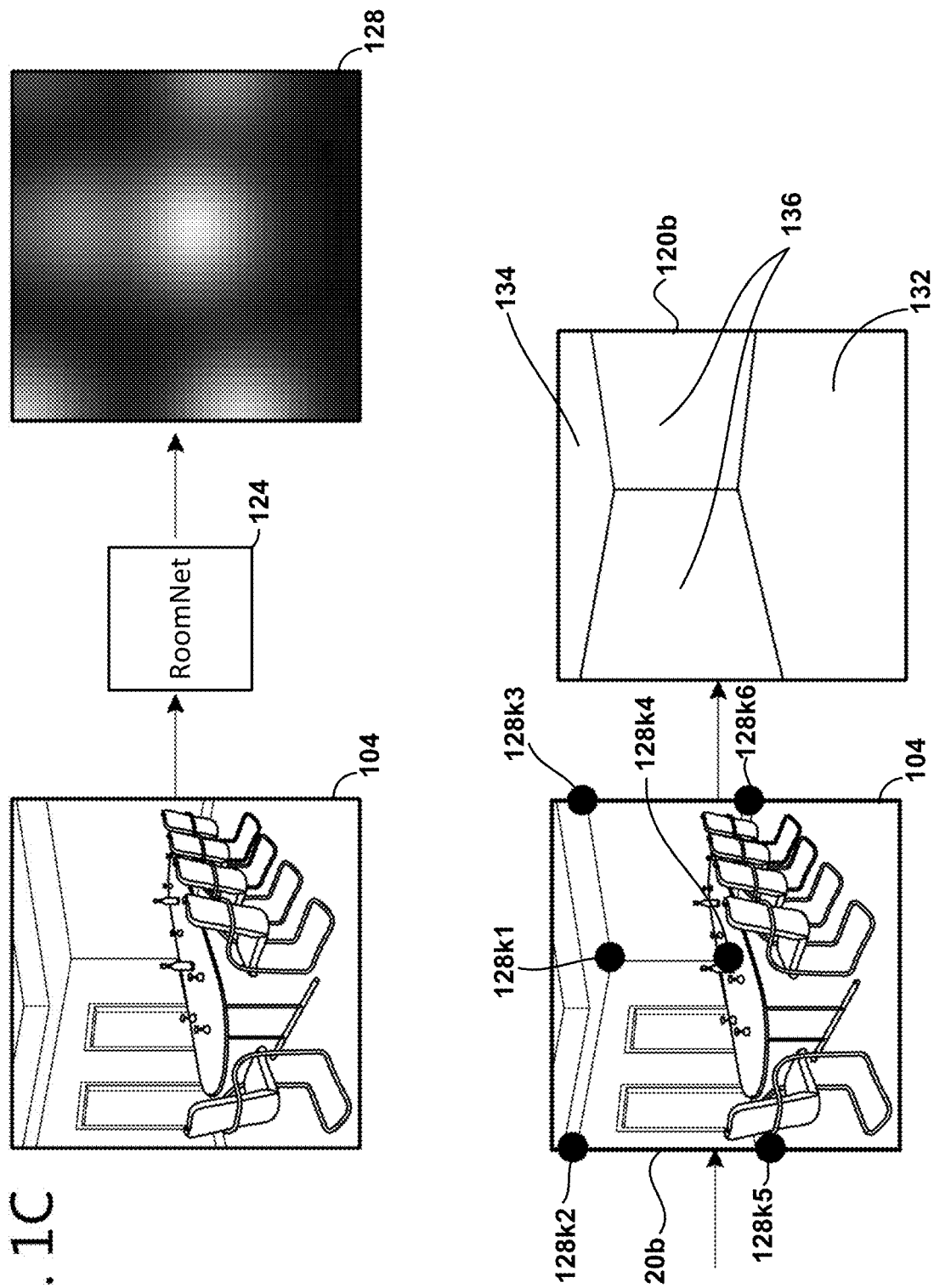

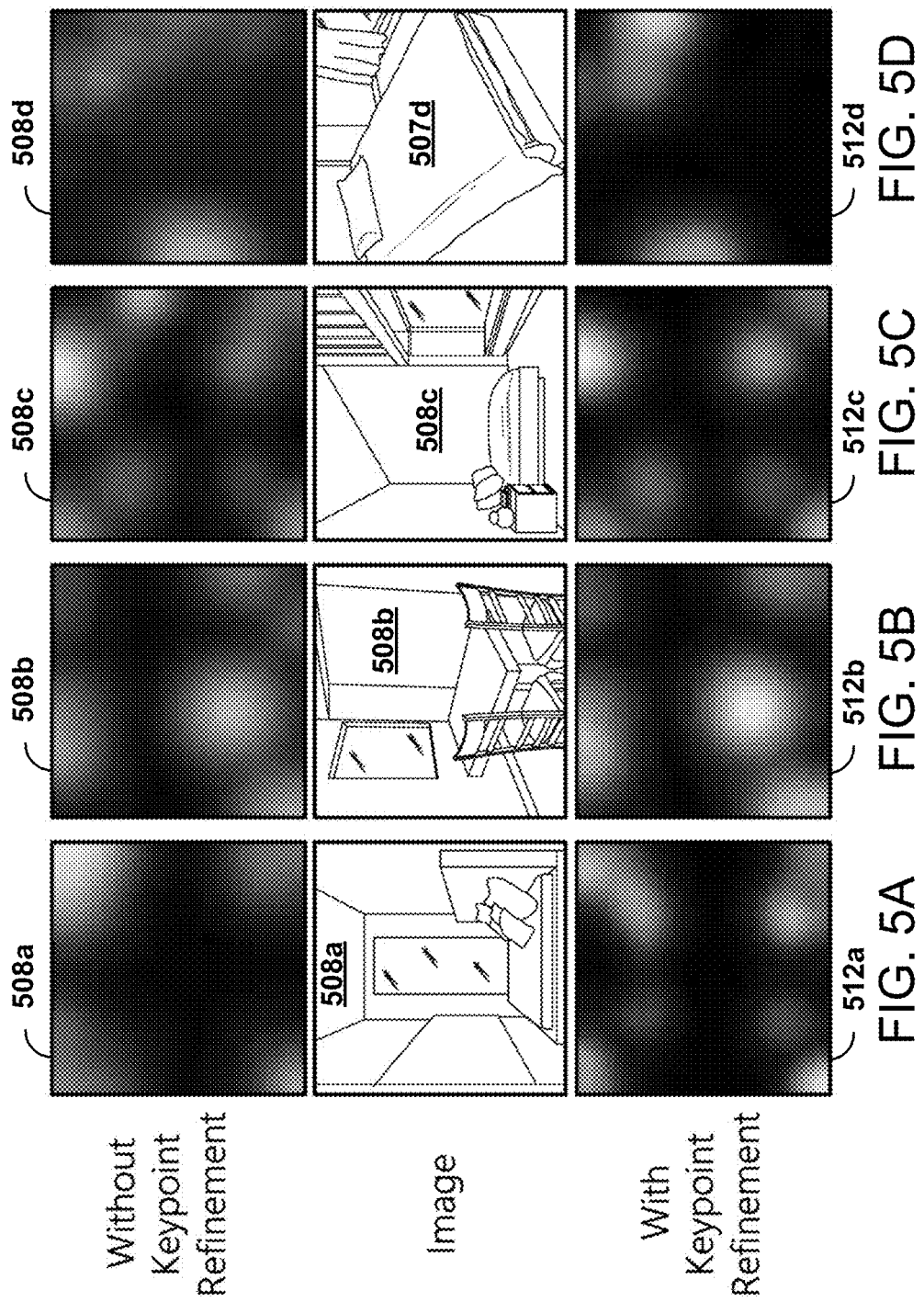

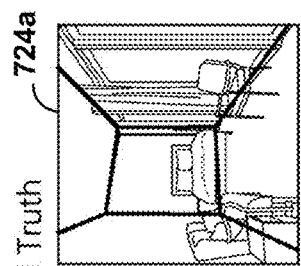 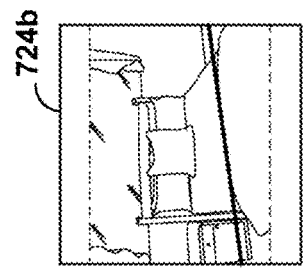 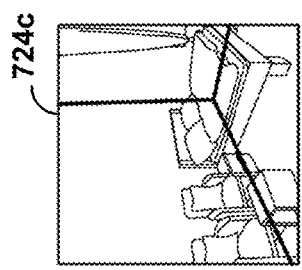
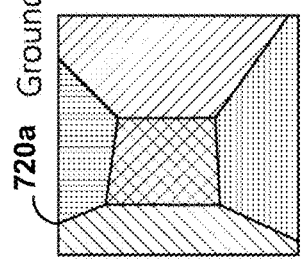 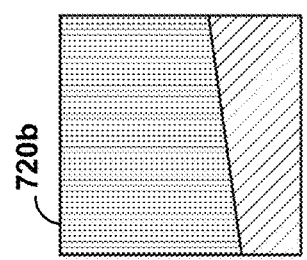 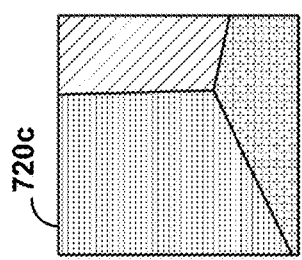
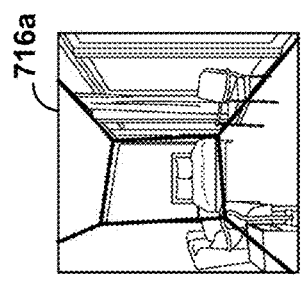 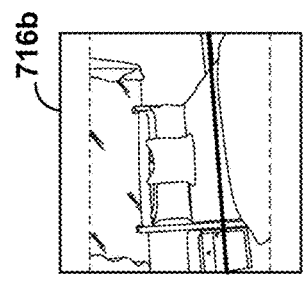 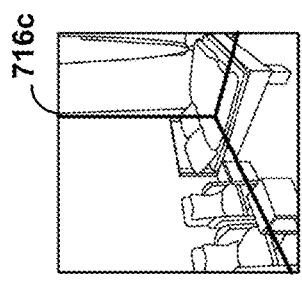
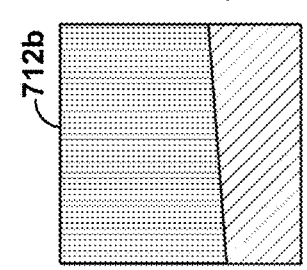 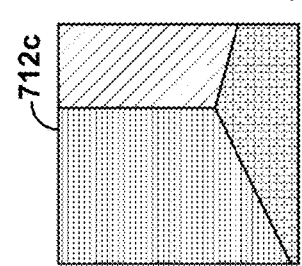
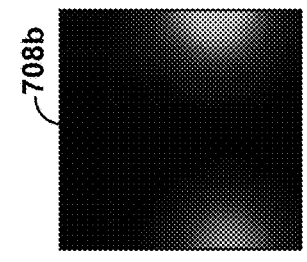
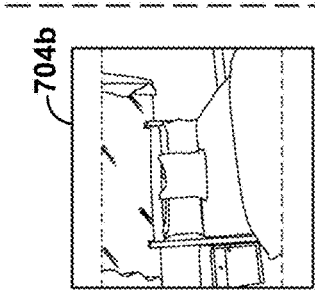
FIG. 7A  FIG. 7B  FIG. 7C

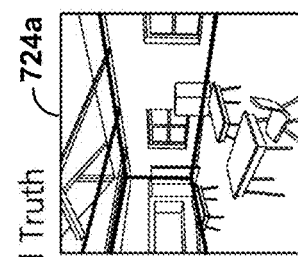
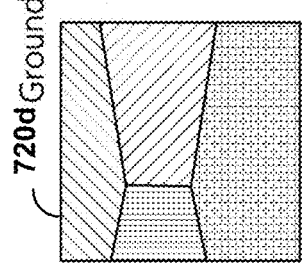
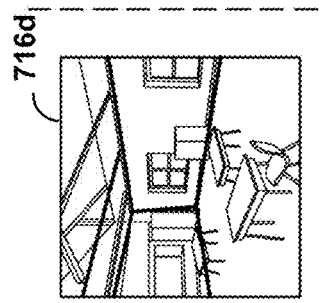
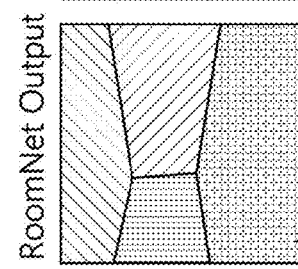
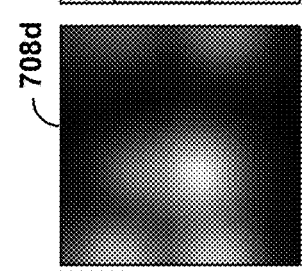
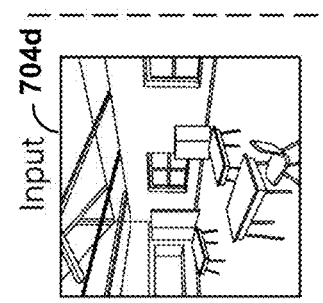
FIG. 7D
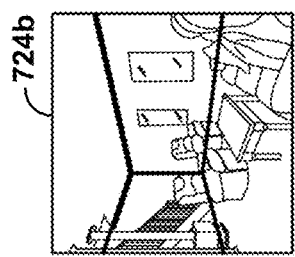
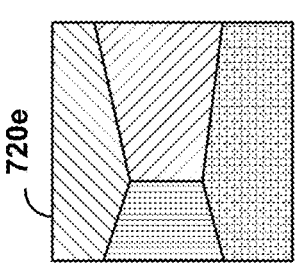
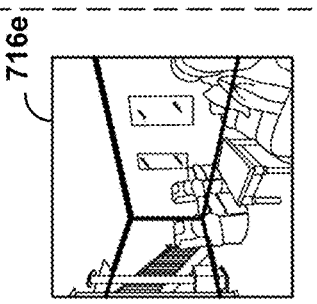
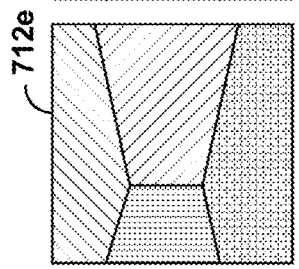
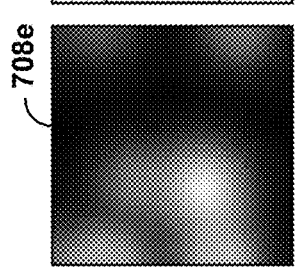
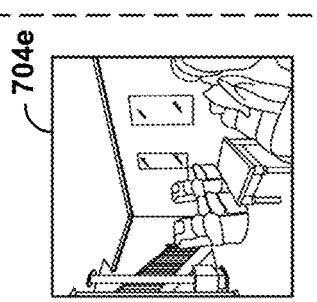
FIG. 7E
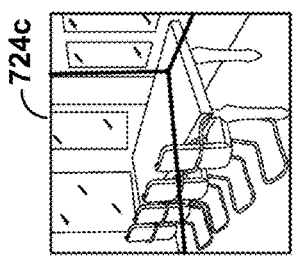
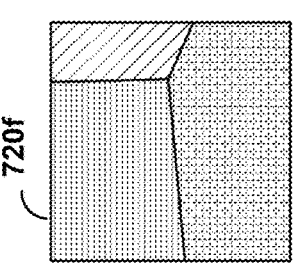
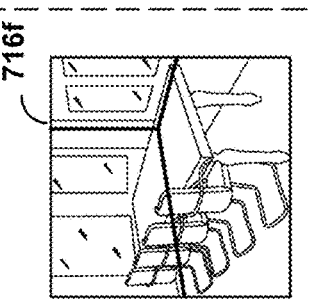
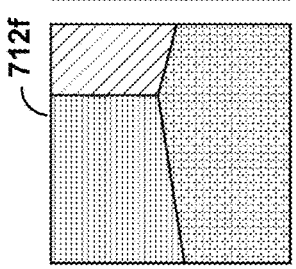
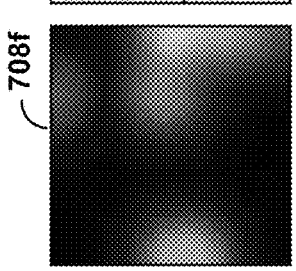
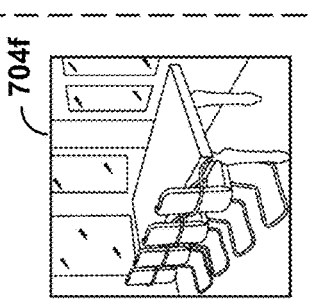
FIG. 7F

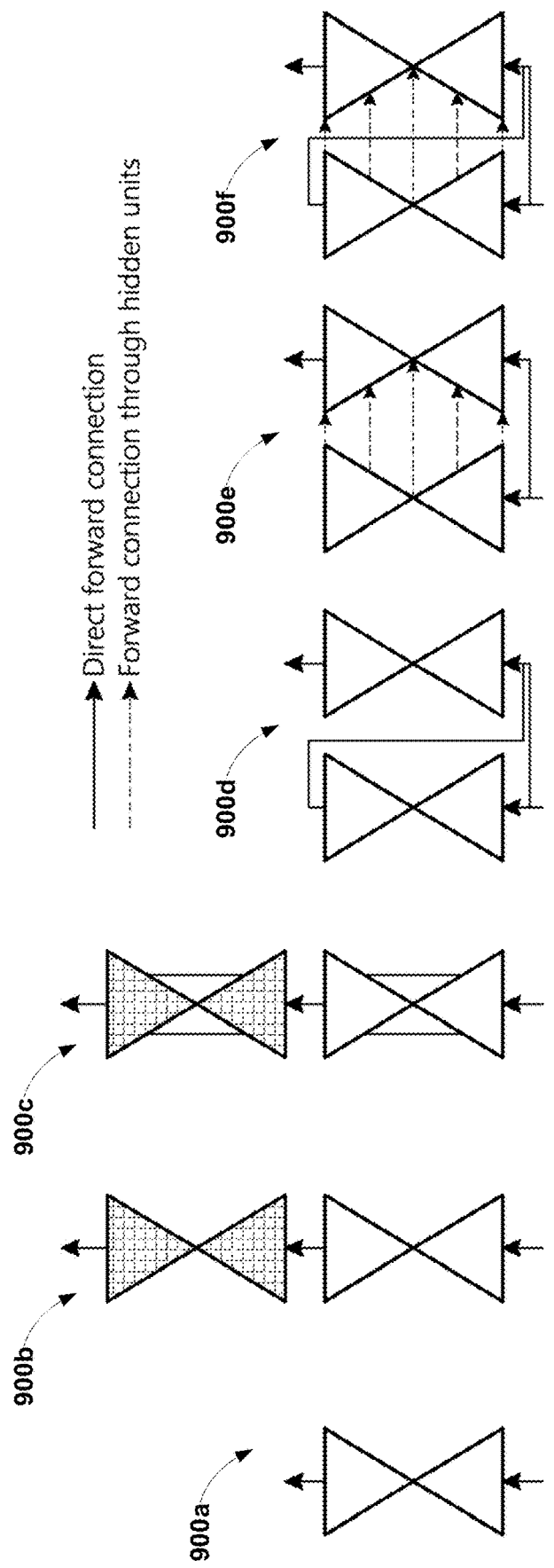

ROOM LAYOUT ESTIMATION METHODS AND TECHNIQUES

CROSS-REFERENCE TO RELATED APPLICATIONS

This application is a continuation of U.S. patent application Ser. No. 15/923,511, filed Mar. 16, 2018, entitled "ROOM LAYOUT ESTIMATION METHODS AND TECHNIQUES," which claims the benefit of priority to U.S. Patent Application No. 62/473,257, filed Mar. 17, 2017, entitled "ROOM LAYOUT ESTIMATION METHODS AND TECHNIQUES," which is hereby incorporated by reference herein in its entirety.

FIELD

The present disclosure relates generally to systems and methods for estimating a layout of a room using automated image analysis and more particularly to deep machine learning systems (e.g., convolutional neural networks) for determining room layouts.

BACKGROUND

A deep neural network (DNN) is a computational machine learning method. DNNs belong to a class of artificial neural networks (NN). With NNs, a computational graph is constructed which imitates the features of a biological neural network. The biological neural network includes features salient for computation and responsible for many of the capabilities of a biological system that may otherwise be difficult to capture through other methods. In some implementations, such networks are arranged into a sequential layered structure in which connections are unidirectional. For example, outputs of artificial neurons of a particular layer can be connected to inputs of artificial neurons of a subsequent layer. A DNN can be a NN with a large number of layers (e.g., 10s, 100s, or more layers).

Different NNs are different from one another in different perspectives. For example, the topologies or architectures (e.g., the number of layers and how the layers are interconnected) and the weights of different NNs can be different. A weight can be approximately analogous to the synaptic strength of a neural connection in a biological system. Weights affect the strength of effect propagated from one layer to another. The output of an artificial neuron can be a nonlinear function of the weighted sum of its inputs. A NN can be trained on training data and then used to determine an output from untrained data.

SUMMARY

Building a three-dimensional (3D) representation of the world from an image is an important challenge in computer vision and has important applications to augmented reality, robotics, autonomous navigation, etc. The present disclosure provides examples of systems and methods for estimating a layout of a room by analyzing one or more images of the room. The layout can include locations of a floor, one or more walls, a ceiling, and so forth in the room.

In one aspect, a machine learning system comprising a neural network is used for room layout estimation. In various embodiments, the machine learning system is referred to herein by the name RoomNet, because these various embodiments determine a Room layout using a neural Network. The machine learning system can be performed by a hardware computer processor comprising non-transitory storage and can be performed locally or in a distributed (e.g., cloud) computing environment.

The room layout systems and methods described herein are applicable to augmented and mixed reality. For example, an augmented reality (AR) device can include an outward-facing imaging system configured to capture an image of the environment of the AR device. The AR device can perform a RoomNet analysis of the image to determine the layout of a room in which a wearer of the AR device is located. The AR device can use the room layout to build a 3D representation (sometimes referred to as a world map) of the environment of the wearer.

In one aspect, a neural network can analyze an image of a portion of a room to determine the room layout. The neural network can comprise a convolutional neural network having an encoder sub-network, a decoder sub-network, and a side sub-network. The neural network can determine a three-dimensional room layout using two-dimensional ordered keypoints associated with a room type. The room layout can be used in applications such as augmented or mixed reality, robotics, autonomous indoor navigation, etc.

In one aspect, RoomNet comprises an encoder sub-network, a decoder sub-network connected to the encoder network, and a side sub-network connected to the encoder network. After receiving a room image, a plurality of predicted heat maps corresponding to a plurality of room types can be determined using the encoder sub-network and the decoder sub-network of the RoomNet. A predicted room type of the plurality of room types can be determined using the encoder sub-network and the side sub-network of the RoomNet and the room image. Keypoints at a plurality of predicted keypoint locations can be determined using a predicted heat map corresponding to the predicted room type. A predicted layout of a room in the room image can be determined using the predicted room type, the keypoints, and a keypoint order associated with the predicted room type.

In another aspect, a system is used to train a neural network for room layout estimation. Training room images can be used to train the neural network, which can comprise an encoder sub-network, a decoder sub-network connected to the encoder network, and a side sub-network connected to the encoder network. Each of the training room images can be associated with a reference room type and reference keypoints at a reference keypoint locations in the training room image. Training the neural network can include determining, using the encoder sub-network and the decoder sub-network and the training room image, a plurality of predicted heat maps corresponding to the room types, and determining, using the encoder sub-network and the side sub-network and the training room image, a predicted room type. The neural network can include weights that are updated based on a first difference between the reference keypoint locations and a predicted heat map and a second difference between the reference room type and the predicted room type.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIG. 1A is an example pipeline for room layout estimation.

FIG. 1B is an example room layout estimation using an embodiment of the machine learning architecture described herein, which is referred to as RoomNet.

FIG. 1C is another example room layout estimation with a RoomNet.

FIG. 5A-5D show images illustrating example room layout keypoint estimation from single images (middle row) without refinement (top row) and with refinement (bottom row). Keypoint heat maps from multiple channels are shown in a single two dimensional (2D) image for visualization purposes.

FIGS. 7A-7G include images showing example RoomNet predictions and the corresponding ground truth on the Large-scale Scene Understanding Challenge (LSUN) dataset. A RoomNet accessed an RGB image as its input (first column in each figure) and produced an example room layout keypoint heat map (second column in each figure). The final keypoints were obtained by extracting the keypoint location having the maximum response from the heat map. The third and fourth columns in each figure show example boxy room layout representations generated by connecting the obtained keypoints in a specific order as described with reference to FIG. 2. The fifth and sixth columns in each figure show example ground truth.

FIGS. 9A-9F depict example encoder-decoder architectures: (FIG. 9A) a vanilla encoder-decoder; (FIG. 9B) a stacked encoder-decoder; (FIG. 9C) a stacked encoder-decoder with skip-connections; (FIG. 9D) an encoder-decoder with feedback; (FIG. 9E) a memory augmented recurrent encoder-decoder; and (FIG. 9F) a memory augmented recurrent encoder-decoder with feedback.

Figure 2:
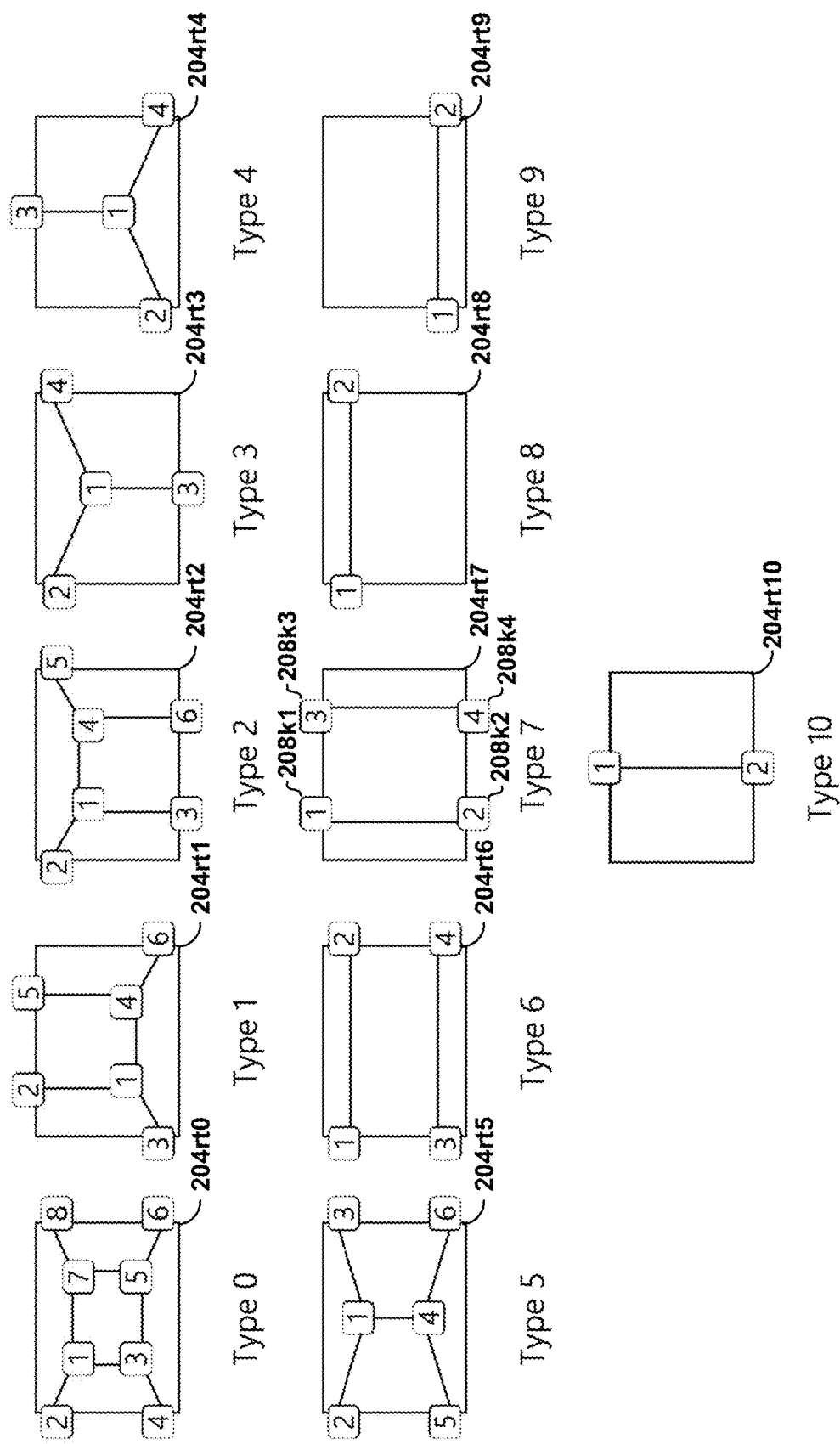
FIG. 2 shows example definitions of room layout types. The type can be indexed from 0 to 10. The number on each keypoint defines a specific order of points saved in the ground truth. For a given room type, the ordering of the keypoints can specify their connectivity.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

Models representing data relationships and patterns, such as functions, algorithms, systems, and the like, may accept input, and produce output that corresponds to the input in some way. For example, a model may be implemented as a machine learning method such as a convolutional neural network (CNN) or a deep neural network (DNN). Deep learning is part of a broader family of machine learning methods based on the idea of learning data representations as opposed to task specific algorithms and shows a great deal of promise in solving audio-visual computational problems useful for augmented reality, mixed reality, virtual reality, and machines intelligence. In machine learning, a convolutional neural network (CNN, or ConvNet) can include a class of deep, feed-forward artificial neural networks, and CNNs have successfully been applied to analyzing visual imagery. Machine learning methods include a family of methods that can enable robust and accurate solutions to a wide variety of problems, including eye image segmentation and eye tracking.

Disclosed herein are examples of a neural network for room layout estimation called RoomNet. RoomNet can analyze an image of at least a portion of a room to determine the room layout. The room layout can include a representation of locations of a floor, a wall, or a ceiling in the room. The image can, for example, comprise a monocular image or a grayscale or color (e.g., Red-Green-Blue (RGB)) image. The image may be a frame or frames from a video. Other techniques divide room layout estimation into two subtasks: semantic segmentation of floor, walls, and ceiling to produce layout hypotheses, followed by iterative optimization step to rank these hypotheses.

In contrast to these approaches, RoomNet can formulates the room layout problem as estimating an ordered set of room layout keypoints. The room layout and the corresponding segmentation can be completely specified given the locations of these ordered keypoints. The RoomNet can be an end-to-end trainable encoder-decoder network. A RoomNet machine learning architecture may have better performance (e.g., in terms of the amount of computation, accuracy, etc.). In some embodiments, a RoomNet can have an architecture that includes recurrent computations and memory units to refine the keypoint locations under similar, or identical, parametric capacity.

Stereoscopic images can provide depth information on a room layout. Room layout estimation from a monocular image (which does not include depth information) is challenging. Room layout estimation from monocular images, which aims to delineate a two-dimensional representation (2D) representation (e.g., boxy representation) of an indoor scene, has applications for a wide variety of computer vision tasks, such as indoor navigation, scene reconstruction or rendering, or augmented reality. FIG. 1A illustrates a conventional room layout technique that takes an image 104, extracts image features 108, such as local color, texture, and edge cues in a bottom-up manner, followed by vanishing point detection 112. Conventional methods may include a separate post-processing stage used to clean up feature outliers and generate, or rank, a large set of room layout hypotheses 116 with structured support vector machines (SVMs) or conditional random fields (CRFs). In principle, the 3D reconstruction of the room layout can be obtained (e.g., up to scale) with knowledge of the 2D layout 120a and the vanishing points determined using these methods. However, in practice, these conventional methods are complicated and the accuracy of the final layout prediction often largely depends on the quality of the extracted low-level image features, which in itself is susceptible to local noise, scene clutter and occlusion. Advantageously, embodiments of a RoomNet of the disclosure may not be susceptible to local noise, scene clutter and occlusion. Further, room layout estimation provided by RoomNet may advantageously have better performance (e.g., in terms of the amount of computation, such as 200× or 600×) than other methods.

In some embodiments, a RoomNet may have better performance than other room layout estimation methods based on convolutional neural networks (CNNs), such as deep neural networks, semantic segmentation, a fully convolutional network (FCN) model that produces informative edge maps that replace hand engineered low-level image feature extraction. The predicted edge maps generated by such FCN can then be used to sample vanishing lines for layout hypotheses generation and ranking. For example, the FCN can be used to learn semantic surface labels, such as left wall, front wall, right wall, ceiling, and ground. Then connected components and hole filling techniques can be used to refine the raw per pixel prediction of the FCN, followed by the classic vanishing point/line sampling methods to produce room layouts. In contrast to such methods that generate a new set of low-level features and may require 30 seconds or more to process each frame, a RoomNet can be an end-to-end trainable CNN that is more computationally efficient.

In some embodiments, predictions of a RoomNet need not be post-processed by a hypotheses testing stage, which can be expensive, to produce the final layout. A RoomNet may perform room layout estimation using a top-down approach and can be directly trained to infer both the room layout keypoints (e.g., corners) and room type. Once the room type is inferred or determined and the corresponding set of ordered keypoints are localized or determined, the keypoints can be connected in a specific order, based on the room type determined, to obtain the 2D spatial room layout.

A RoomNet architecture may be direct and simple as illustrated in FIGS. 1B and 1C. As will be further explained below, the RoomNet 124 can take an input image 104 (e.g., of size 320 pixels×320 pixels), process the image through a convolutional encoder-decoder architecture, extract a set of room layout keypoints 128k1-128k6 from a keypoint heat map 128 corresponding to a particular room layout, and then (optionally) connect the obtained keypoints in a specific order to provide a room layout 120b. The room layout 120b can include locations or orientations of vertical or horizontal surfaces in the room such as, e.g., a floor 132, a ceiling 134, and walls 136.

Optionally, the room layout can be regressed as described below. The room layout 120b can be used, for example, in a world map for augmented reality or indoor autonomous navigation or for scene reconstruction or rendering. Optionally, the room layout can be output as a drawing, architectural map, etc. The semantic segmentation of the layout surfaces can be simply obtainable as a consequence of this connectivity and represented as a semantically segmented room layout image 136. Accordingly, a RoomNet performs the task of room layout estimation by keypoint localization. In some embodiments, a RoomNet can be an encoder-decoder network based on a CNN. A RoomNet can be parametrically efficient and effective in joint keypoint regression and room layout type classification.

Example Keypoint-Based Room Layout Representation

Embodiments of a RoomNet can be effective in room layout estimation. A RoomNet can be based on target output representation that is end-to-end trainable and can be inferred efficiently. A RoomNet can complement, or supplement, methods based on assigning geometric context or semantic classes (e.g., floor, walls, or ceiling, etc.) to each pixel in an image, and then obtaining room layout keypoints and boundaries based on the pixel-wise labels. Deriving layout keypoints and boundaries from the raw pixel output may be non-trivial and less efficient than embodiments of a RoomNet. In contrast, a RoomNet can be based on a model that directly outputs a set of ordered room layout keypoint locations, such that both keypoint-based and pixel-based room layout representations may be obtained efficiently with high accuracy. A RoomNet can reduce or eliminate the ambiguity in the pixel-based representation used by other methods. Embodiments of RoomNet thus are able to distinguish between different surface identities (e.g., front walls, side walls, floors, ceilings). For instance, a RoomNet may correctly distinguish between a front wall class and a right wall class, and thereby output regular, not mixed, labels within the same surface. Accordingly, a RoomNet may have better overall room layout estimation accuracy and performance.

In some implementations, a RoomNet may be trained using a keypoint-based room layout representation illustrated in FIG. 2. FIG. 2 shows a list of example room types 0-10 204rt0-204rt10 with their respective keypoint definition labeled as 1, 2, 3, 4, 5, 6, 7, and/or 8. The number on each keypoint defines a specific order of points saved in ground truth. These 11 room layout types can cover most of the possible situations under typical camera poses and common room layout representations under the Manhattan world assumption, in which objects, edges, corners in images are built on a Cartesian grid, leading to regularities in image gradient statistics. In various embodiments, the room type can be represented by a plurality of polygonal regions, with each region corresponding to, e.g., a floor, a ceiling, right wall, a middle wall, a left wall, etc. The room types can be organized by a set of corner keypoints, for example, corners that correspond to intersections of the polygonal regions. For example, in room type 204rt5, a left wall is bounded by keypoints 1, 2, 5, and 4; a right wall keypoint is bounded by keypoints 1, 3, 6, and 4; a floor is bounded by keypoints 5, 4, 6; and a ceiling is bounded by keypoints 2, 1, 3. The room type can be segmented semantically to identify the floor, wall, and ceiling.

Once the trained RoomNet predicts correct keypoint locations with an associated room type, these points can then be connected in a specific order to produce a boxy room layout representation. For example, the room type 7 204rt7 includes four ordered keypoint locations 208k1-208k4, such that a boxy room layout representation can be constructed by connecting keypoint 1 208k1 with keypoint 2 208k2 and keypoint 3 208k3 with keypoint 4 208k4. The 11 room layouts include one room layout type 204rt0 with eight keypoints, three room layout types 204rt1, 204rt2, and 204rt5 with six keypoints, four room layout types 204rt3, 204rt4, 204rt6, and 204rt7 with four keypoints, and three room layout types 204rt8, 204rt9, and 204rt10 with two keypoints. Room layouts with the same number of keypoints can have the same keypoint connectivity (such as room layout type 3 and 4, 204rt3 and 204rt4) or different keypoint connectivity (such as room layout type 1 and 2, 204rt3 and 204rt4). Although 11 room layout types are used in this example, a different number of room layout types can be used in other implementations (e.g., 5, 10, 15, 20, or more) or room layout types having a different arrangement than shown in FIG. 2.

Example Architecture of RoomNet

A neural network for room layout estimation of the disclosure can include a convolutional neural network (CNN) that to delineate room layout structure using two dimensional (2D) keypoints. The input to the RoomNet can be a monocular image, for example, a single Red-Green-Blue (RGB) image or RGB frame from a video. The output of the RoomNet can include a set of 2D keypoints associated with a specific order with an associated room type.

Figure 3:
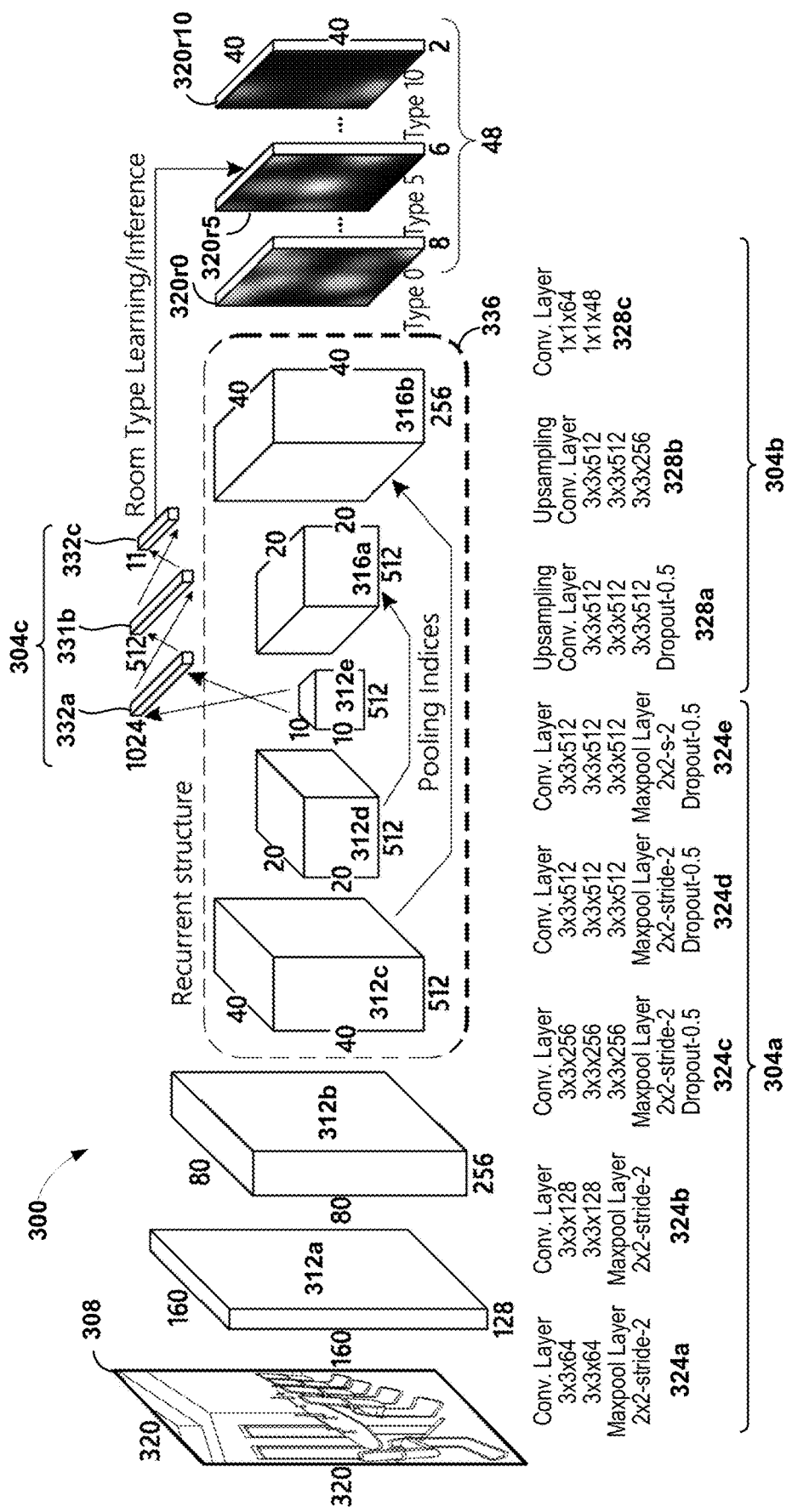
FIG. 3 depicts another example architecture of a RoomNet.

Keypoint estimation. In some embodiments, a RoomNet can include a base network architecture for keypoint estimation and semantic segmentation of surfaces of a room, such as roof (or ceiling), left wall, right wall, back wall, floor, etc. FIG. 3 depicts an example architecture of a RoomNet 300. In this example architecture, a decoder upsamples its input using the transferred pooling indices from its encoder to produce sparse feature maps followed by a several convolutional layers with trainable filter banks to densify the feature responses. The final decoder output keypoint heat maps are fed to a regressor with Euclidean losses. A side head with three fully-connected layers is attached to the bottleneck layer and used to train and predict the room type class label, which is then used to select the associated set of keypoint heat maps. The full model of a RoomNet with recurrent encoder-decoder (center dashed block) further performs keypoint refinement as described with reference to FIGS. 4B and 5.

With continued reference to FIG. 3, the RoomNet 300 can include an encoder sub-network 304a and a decoder sub-network 304b. The encoder sub-network 304a can map an input image 308 to lower resolution feature maps 312a-312e. The decoder sub-network 304b can upsample the low resolution encoded feature maps 312e to higher resolution maps 316a-316b and heat maps 320r0-320r10 (e.g., with the same or lower resolution compared to the input image 308) for pixel-wise classification. Dimensionalities of the input image 308, feature maps 312a-312e, 316a-316b, and heat maps 320r0-320r10 are labeled in the RoomNet example 300 shown in FIG. 3. The encoder sub-network 304a can include a plurality of convolutional layers and pooling layers 324a-324e. The decoder sub-network 304b can include a plurality of convolutional layers and upsampling layers 328a-328c. In some embodiments, the decoder sub-network 304b can use pooling indices computed in the maxpooling step or layer of the corresponding encoder sub-network 304b to perform non-linear upsampling. For example, the weights of the maxpooling layer used to generate the feature maps 312e can be used to upsample the feature maps 312e. As another example, the weights of the maxpooling layer used to generate the feature maps 312c can be used to upsample the feature maps 316a. Pooling indices can minimize, or eliminate, the need for learning to upsample. The upsampled maps can be sparse and can be convolved with trainable filters to produce dense feature maps 316a, 316b. This encoder-decoder architecture can provide good performance with competitive inference time and efficient memory usage as compared to other methods for room layout estimation. The number of heat maps 320r0-320r10 can be the number of defined room types, such as 5, 10, 11, 15, or more. FIG. 3 shows the number of keypoints associated with each room type. For example, room type 0 320r0 is associated with eight keypoints. Each of the eight keypoints can be, for example, identified as the highest peak in each of the eight heat maps 320r0. Accordingly, the number of heat maps 320r0-320r10 output by the RoomNet 300 can be the total number of keypoints of the different room types. In the example illustrated in FIG. 3, the number of heat maps 320r0-320r10 is 48.

The base architecture of the RoomNet 300 can take an image 308 of an indoor scene and directly output a set of 2D room layout keypoints to recover the room layout structure. Each keypoint ground truth can be represented by a 2D Gaussian heat map centered at the true keypoint location as one of the channels in the output layer. In some embodiments, the keypoint heat maps 320r0-320r10 in a single 2D image can be color coded for visualization. The encoder-decoder architecture of the RoomNet 300 can process the information flow through bottleneck layer (e.g., the convolutional and maxpooling layer 324e), enforcing the bottleneck layer to implicitly model the relationship among the keypoints that encode the 2D structure of the room layout.

In some embodiments, the decoder sub-network 304b of the RoomNet 300 can upsample the feature maps 312e from the bottleneck layer 324e with spatial dimension 10×10 to 40×40 instead of the full resolution 320 pixels×320 pixels as shown in FIG. 3. Such reduction in the dimensionality of the output heat maps 320r0-320r10 to 40 pixels×40 pixels, compared to the dimensionality of the input image 308, can be empirically determined using the proposed 2D keypoint-based representation to already model the room layout effectively. In some embodiments, the width and height of heat maps 320r0-320r10 can be the same as those of the input image 308, such as 320 pixels×320 pixels. Embodiments of the RoomNet 300 with different output dimensions may have similar performance. Using this trimmed decoder sub-network 304b can advantageously reduce (e.g., significantly reduce) the memory usage or time cost during both training and testing due to the high computation cost of convolution at higher resolutions.

Extending to multiple room types. The framework or architecture of the RoomNet 300 is not limited to one particular room type. Embodiments of the RoomNet can be generalized for multiple room types without training one network per class. Such embodiments of the RoomNet 300 can be efficient and fast from the ground up. The RoomNet embodiment 300 illustrated in FIG. 3 can predict room layout keypoints for an associated room type with respect to the input image in one forward pass. The number of channels in the output layer 328c can match the total number of keypoints for all defined room types (e.g., a total 48 keypoints for the 11 room types illustrated in FIG. 2). The RoomNet 300 can also include a side head or side sub-network 304c with connected layers 332a-332c (e.g., fully connected layers) to the bottleneck layer 324e (e.g., a layer usually used for image classification) to predict the room type prediction as shown in FIG. 3. The side sub-network can comprise a classifier network to classify a room type in the room image.

A training example or room image can be denoted as (I,y,t), where y is a list of the ground truth coordinates of the k keypoints with the room type t for the input image I. At the training stage, a loss function L can include a first loss for the predicted keypoints and a second loss for the predicted room type. The first loss can be a Euclidean loss, which can be used as the cost function for layout keypoint heat map regression. During training, the second loss can be a cross-entropy loss (e.g., logarithmic), which can be used for the room type prediction. Given the keypoint heat map regressor φ (e.g., output from the decoder sub-network 304b), and the room type classifier ψ (e.g., output from the fully-connected side head layer 304c), the loss function L shown in Equation [1] can be optimized (e.g., reduced or minimized).

$$L = \Sigma_k 1_{k,t}^{keypoint} \|G_k(y) - \varphi_k(I)\|^2 - \lambda \Sigma_c 1_{c,t}^{room} \log(\psi_c(I)),$$  Equation [1]

where $1_{k,t}^{keypoint}$ denotes whether keypoint k appears in ground truth room type t, $1_{c,t}^{room}$ denotes whether room type index c equals to the ground truth room type t, the function G is a Gaussian centered at y, and the weight term is λ. For example, the weight term λ (e.g., 5) can be set by cross validation. The first term in the loss function compares the predicted heat maps 320r0-320r10 to ground-truth heat maps synthesized for each keypoint separately. The ground truth for each keypoint heat map can be a 2D Gaussian centered on the true keypoint location with standard deviation of a number of pixels (e.g., 5 pixels). The second term in the loss function can encourage the side head 304c fully-connected layers 332a-332c to produce a high confidence value with respect to the correct room type class label.

One forward pass of the RoomNet 300 can produce 2D room layout keypoints 320r0-320r10 for all defined room types (e.g., 11 in FIG. 2). The 2D room layout keypoints can be in the form of heat maps, where the final keypoints can be extracted as the maxima in these heat maps. In some embodiments, the loss function (e.g., the loss function L shown in Equation [1]) only penalizes Euclidean regression error if the keypoint k is present for the ground truth room type t in the current input image I, effectively using the predicted room type indices to select the corresponding set of keypoint heat maps to update the regressor. The same strategy can apply after the RoomNet 300 is trained (e.g., at the test stage) such that the predicted room type (e.g., by the side network 304c) is used to select the predicted keypoint heat map in the final output.

RoomNet extension for keypoint refinement. Recurrent neural networks (RNNs) and their variants Long Short-Term Memory (LSTM) can be effective models when dealing with sequential data. Embodiments of a RoomNet 300 can incorporate recurrent structures, even though the input image 308 is static. For example, a RoomNet 300 can include recurrent convolutional layers and convolutional LSTM (convLSTM) layers. In some embodiments, recurrent features of a RoomNet 300 can be similar to models such as a fully convolutional network (FCN) with conditional random fields as recurrent neural network (CRF-RNN), iterative error feedback networks, recurrent CNNs, stacked encoder-decoder, and recurrent encoder-decoder networks. Incorporating a time series concept when modeling a static input can significantly improve the ability of the RoomNet 300 to integrate contextual information and to reduce prediction error in some cases.

Figure 4A:
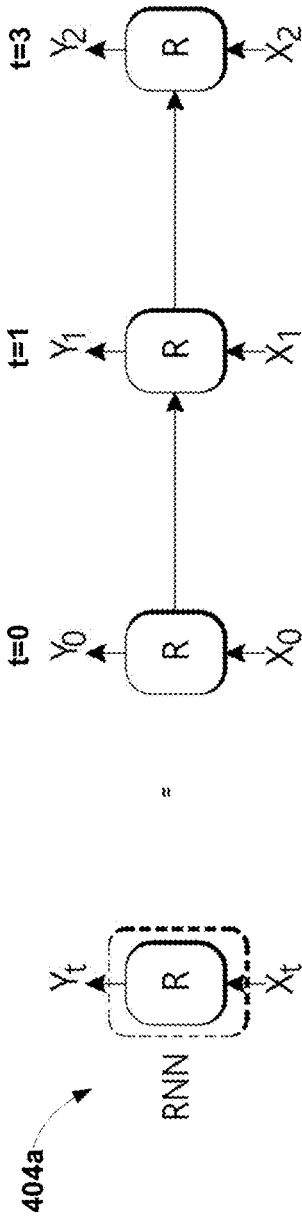
FIG. 4A shows an example illustration of an unroller version of a recurrent neural network (RNN) with three iterations.

A base RoomNet architecture can be extended by making the central encoder-decoder component 336 (see, e.g., the center dashed line block in FIG. 3) recurrent. For example, a RoomNet 300 can include a memory augmented recurrent encoder-decoder (MRED) structure 404b (see FIG. 4B) to mimic the behavior of a typical recurrent neural network 404a (see the example shown in FIG. 4A) in order to refine the predicted keypoint heat maps over by iterating over an artificial time—the artificial time steps (e.g., the iterations) are created by the recurrent structure.

Each layer 312c-312e, 316a-316b in this MRED structure 404b can share the same weight matrices through different time steps (e.g., iterations) that convolve (denoted as * symbol) with the incoming feature maps from the previous prediction $h_l(t-1)$ at time step t−1 in the same layer l, and the current input $h_{l-1}(t)$ at time step t in the previous layer l−1, generating output at time step t as shown in Equation [2].

$$h_l(t) = \begin{cases} \sigma(w_l^{current} * h_{l-1}(t) + b_l), & t = 0 \\ \sigma(w_l^{current} * h_{l-1}(t) + w_l^{previous} * h_l(t-1) + b_l), & t > 0 \end{cases},$$  Equation [2]

where $w_l^{current}$ and $w_l^{previous}$ are the input and feed-forward weights for layer l, $b_l$ is the bias for layer l, and σ is an activation function, e.g., a rectified linear unit (ReLU) activation function.

Figure 4B:
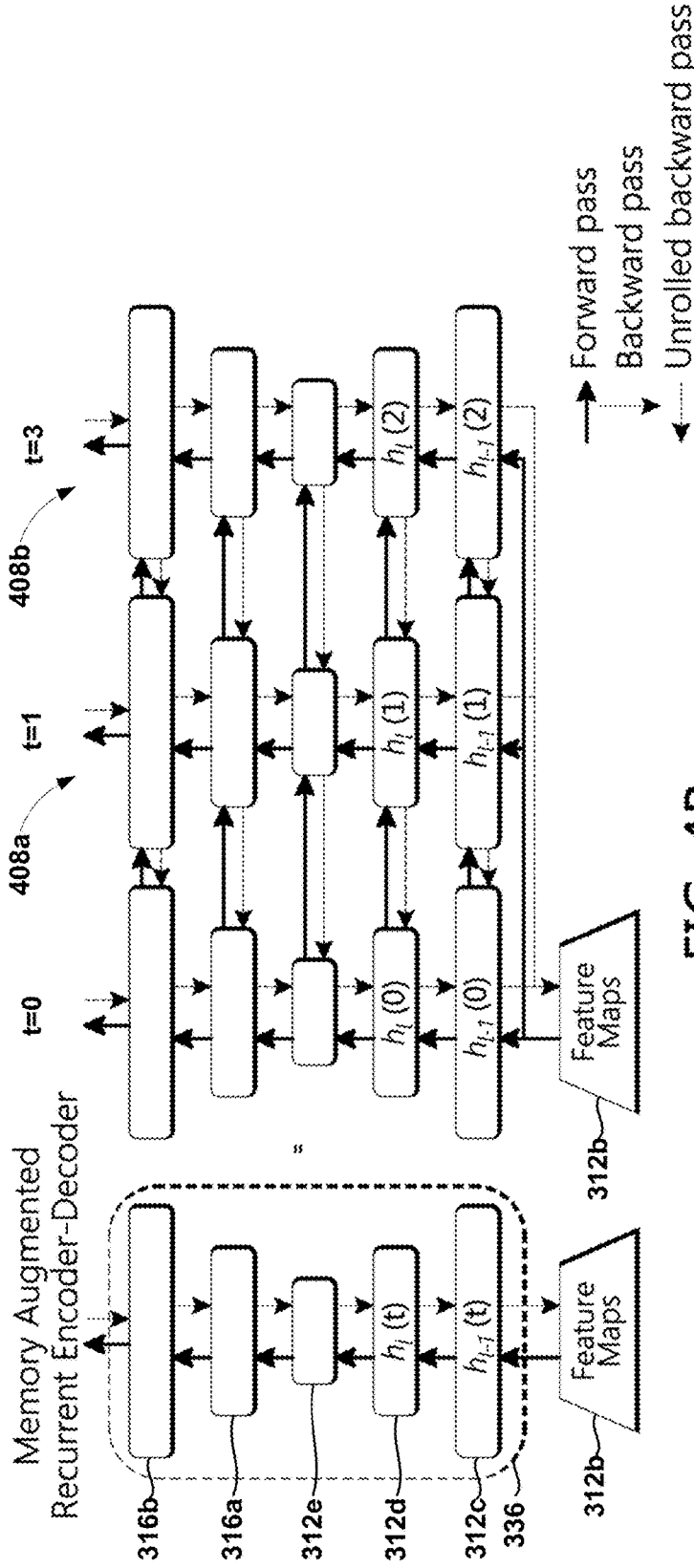
FIG. 4B shows an example RoomNet with a memory augmented recurrent encoder-decoder (MRED) architecture that mimics the behavior of a RNN but which is designed for a static input.

FIG. 4B demonstrates an example overall process of the information flow during forward propagations and backward propagations through depth and time within the recurrent encoder-decoder structure. The memory augmented recurrent encoder-decoder (MRED) architecture 404b includes hidden units 408a, 408b to store previous activations that help the inference at the current time step. Non-limiting example advantages of using the proposed MRED 404b architecture include (1) exploiting the contextual and structural knowledge among keypoints iteratively through hidden/memory units (e.g., that have not been explored in recurrent convolutional encoder-decoder structure) or (2) weight sharing of the convolutional layers in the recurrent encoder-decoder, resulting in a much deeper network with a fixed number of parameters.

After refinement, the heat maps of keypoints are much cleaner as shown in the bottom rows of FIG. 5A-5D. FIGS. 5A-5D show images illustrating example room layout keypoint estimation from single images (middle row, images 504a-504d) without refinement (top row, heat maps 508a-508d) and with refinement (bottom row, heat maps 512a-512d). Keypoint heat maps from multiple channels are shown in a single two dimensional (2D) image for visualization purposes. The keypoint refinement step produces more concentrated and cleaner heat maps and removes false positives, if any. Improvements were made by embodiments of the RoomNet 300 with an MRED architecture 404b (see FIGS. 5C-5D).

Figure 6B:
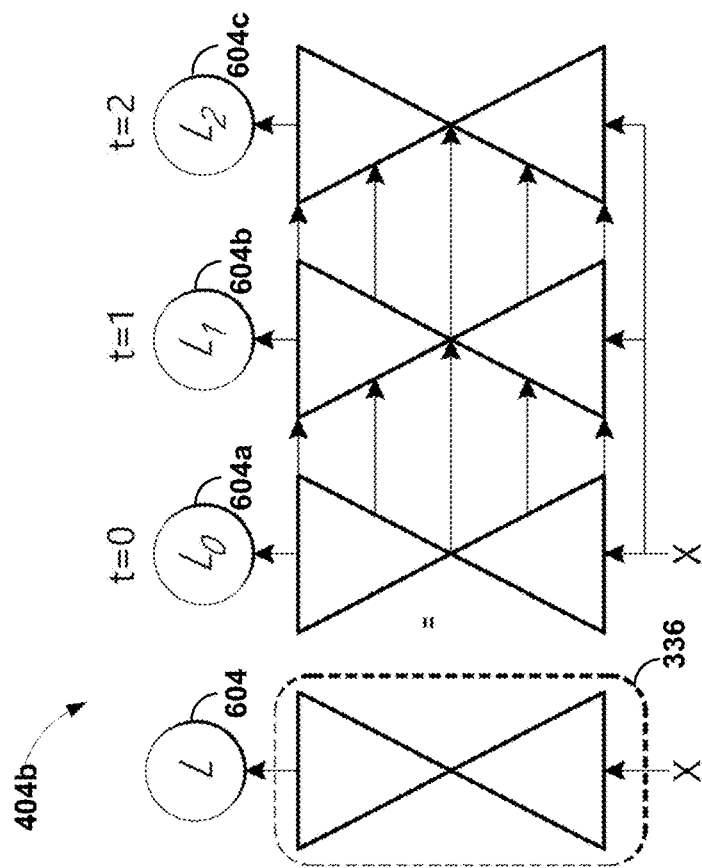
FIGS. 6A-6B depicts examples memory augmented recurrent encoder-decoder architectures without deep supervision through time (FIG. 6A) and with deep supervision through time (FIG. 6B).
Figure 6A:
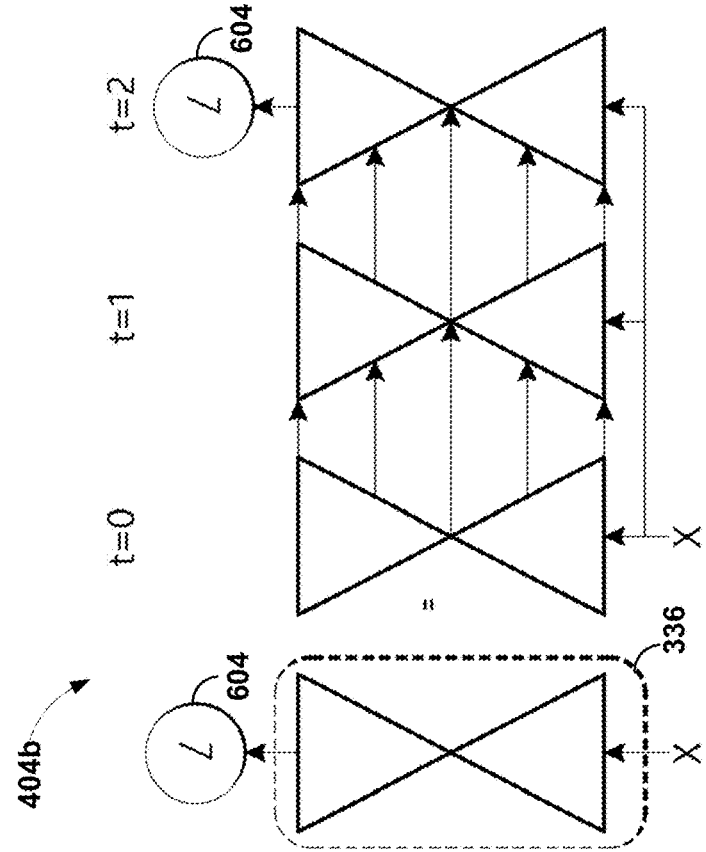
Figure 7G:
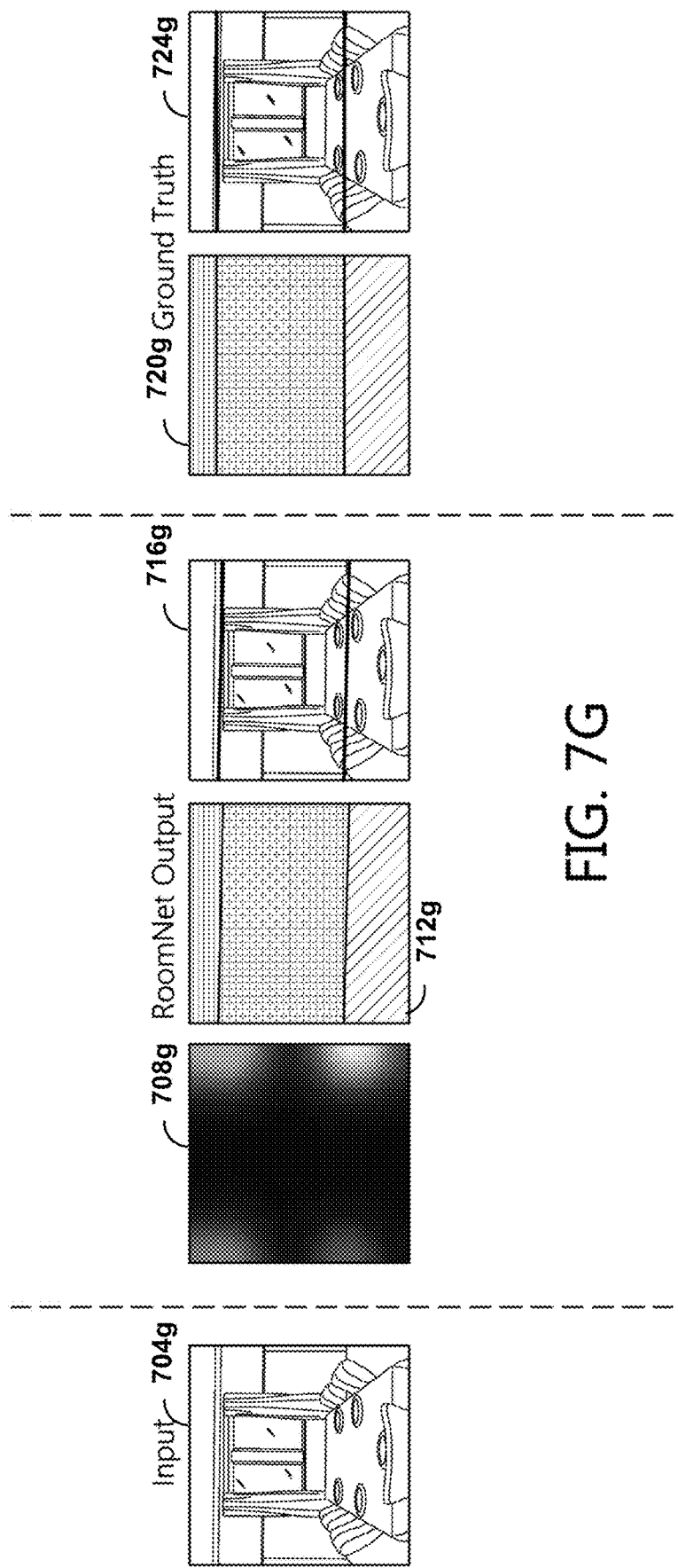
Figure 8A:
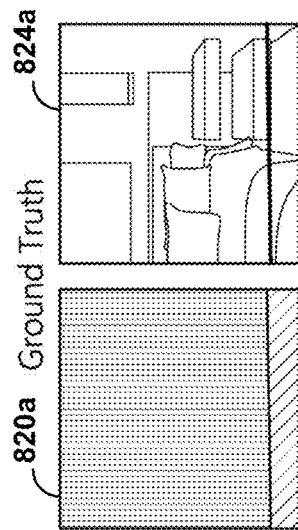
FIGS. 8A-8D show examples where the room layout predictions from an embodiment of RoomNet are less good matches to the (human-annotated) ground truth layouts. The first column in each figure shows an example input image. The second column in each figure shows an example predicted keypoint heat map. The third and fourth columns in each figure show example boxy representations obtained. The fifth and sixth columns show example ground truth.
Figure 8B:
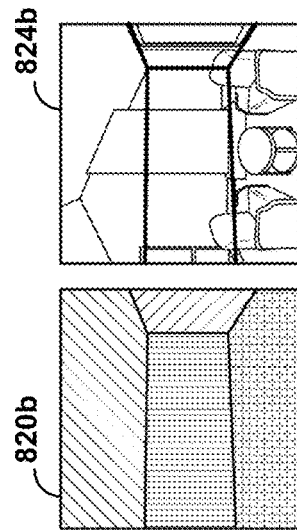
Figure 8C:
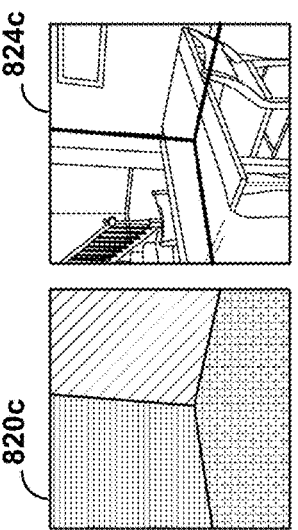
Figure 8D:
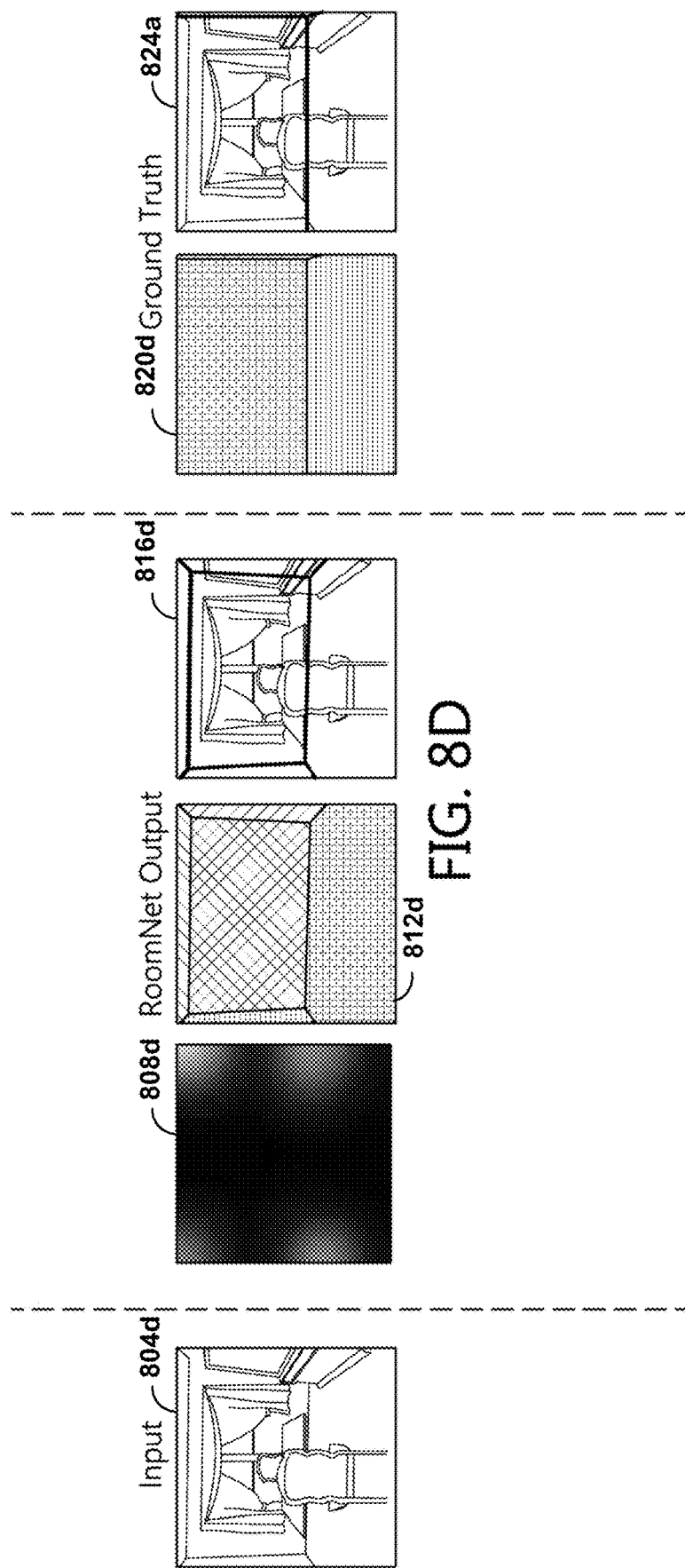

Deep supervision through time. When applying stacked, iterative, or recurrent convolutional structures, each layer in a network can receive gradients across more layers or/and time steps, resulting in models that are much harder to train. For instance, the iterative error feedback network can require multi-stage training and the stacked encoder-decoder structure can uses intermediate supervision at the end of each encoder-decoder even when batch normalization is used. Training a RoomNet 300 can include injecting supervision at the end of each time step. For example, the same loss function L 604, such as the loss function shown in Equation [1], can be applied to all the time steps. The three loss functions $L_1$ 604a, $L_2$ 604b, and $L_3$ 604c that are injected at the end of each time step in FIG. 6B can be the identical or different. FIGS. 6A-6B depict examples of memory augmented recurrent encoder-decoder architectures without deep supervision through time (FIG. 6A) and with deep supervision through time (FIG. 6B). Deep supervision can improve performance of a RoomNet 300 through time.

Example Training

Datasets. Embodiments of a RoomNet 300 were tested on two challenging benchmark datasets: the Hedau dataset and the Large-scale Scene Understanding Challenge (LSUN) room layout dataset. The Hedau dataset contains 209 training, 53 validation, and 105 test images that are collected from the web and from LabelMe. The LSUN dataset consists of 4000 training, 394 validation, and 1000 test images that are sampled from SUN database. All input images were rescaled to 320×320 pixels and used to train the RoomNet 300 from scratch on the LSUN training set only. All experimental results were computed using the LSUN room layout challenge toolkit on the original image scales.

Implementation details. The input to the RoomNet 300 was an RGB image of resolution 320×320 pixels and the output was the room layout keypoint heat maps of resolution 40×40 with an associated room type class label. In other implementations, the image resolution or the heat map resolution can be different. Backpropagation through time (BPTT) algorithm was applied to train the models with batch size 20 stochastic gradient descent (SGD), 0.5 dropout rate, 0.9 momentum, and 0.0005 weight decay. Initial learning rate was 0.00001 and decreased by a factor of 5 twice at epoch 150 and 200, respectively. All variants used the same scheme with 225 total epochs. The encoder and decoder weights were initialized. Batch normalization and rectified linear unit (ReLU) activation function were also used after each convolutional layer to improve the training process. Horizontal flipping of input images was used during training as data augmentation. In some embodiments, a RoomNet 300 can be implemented in the open source deep learning framework Caffe.

A ground truth keypoint heat map may have zero value (background) for most of its area and only a small portion of it corresponds to the Gaussian distribution (foreground associated with actual keypoint location). The output of the network therefore may tend to converge to zero due to the imbalance between foreground and background distributions. In some embodiments, the gradients were weighted based on the ratio between foreground and background area for each keypoint heat map. Gradients of background pixels were degraded by multiplying them with a factor of 0.2, which made training significantly more stable. In some cases, pixels in the background comprise the pixels that are farther from a keypoint than a threshold distance, for example, the standard deviation of the Gaussian distribution used to generate the ground truth heat map, e.g., greater than 5 pixels.

Training from scratch took about 40 hours on 4 NVIDIA Titan X GPUs for one embodiment of RoomNet. One forward inference of the full model (RoomNet recurrent 3-iteration) took 83 ms on a single GPU. For generating final test predictions, both the original input and a flipped version of the image were ran through the network and the heat maps were averaged together (accounting for a 0.12% average improvement on keypoint error and a 0.15% average improvement on pixel error). The keypoint location was chosen to be the max activating location of the corresponding heat map.

Example Performance

In some embodiments, room layout estimation evaluation metrics can include: pixel errors and keypoint errors. A pixel error can be a pixel-wise error between the predicted surface labels and ground truth labels. A keypoint error can be an average Euclidean distance between the predicted keypoint and annotated keypoint locations, normalized by the image diagonal length.

Accuracy. The performance of a RoomNet 300 on both datasets are listed in Table 1 and 2. The previous best method was the two-step framework (per pixel CNN-based segmentation with a separate hypotheses ranking approach). The RoomNet 300 of the disclosure can significantly improve upon and outperform the previous results on both keypoint error and pixel error, achieving state-of-the-art performance. The side head room type classifier obtained 81.5% accuracy on LSUN dataset.

TABLE 1

Performance of a RoomNet architecture on the Hedau dataset.

| Method | Pixel Error (%) |
| --- | --- |
| Hedau et al. (2009) | 21.20 |
| Del Pero et al. (2012) | 16.30 |
| Gupta et al. (2010) | 16.20 |
| Zhao et al. (2013) | 14.50 |
| Ramalingam et al. (2013) | 13.34 |
| Mallya et al. (2015) | 12.83 |
| Schwing et al. (2012) | 12.8 |
| Del Pero et al. (2013) | 12.7 |
| Dasgupta et al. (2016) | 9.73 |
| RoomNet recurrent 3-iteration | 8.36 |

TABLE 2

Performance of a RoomNet architecture on LSUN dataset.

| Method | Keypoint Error (%) | Pixel Error (%) |
| --- | --- | --- |
| Hedau et al. (2009) | 15.48 | 24.23 |
| Mallya et al. (2015) | 11.02 | 16.71 |
| Dasgupta et al. (2016) | 8.20 | 10.63 |
| RoomNet recurrent 3-iteration | 6.30 | 9.86 |

TABLE 3

Runtime evaluation of a RoomNet on an input size of 320 pixels × 320 pixels. The RoomNet full model (with 3-iterations in time) achieved 200 times speedup and the basic RoomNet model (without any iteration in time) achieved 600 times speedup as compared to other methods.

| Method | FPS |
| --- | --- |
| Del Pero et al. (2013) | 0.001 |
| Dasgupta et al. (2016) | 0.03 |
| RoomNet recurrent 3-iter | 5.96 |
| RoomNet recurrent 2-iter | 8.89 |
| RoomNet basic (no iterations) | 19.26 |

TABLE 4

The impact of keypoint refinement step using the memory augmented recurrent encoder-decoder architecture on the LSUN dataset.

| Method | Keypoint Error (%) | Pixel Error (%) |
| --- | --- | --- |
| RoomNet basic | 6.95 | 10.46 |
| RoomNet recurrent 2-iterations | 6.65 | 9.97 |
| RoomNet recurrent 3-iterations | 6.30 | 9.86 |

TABLE 5

The impact of deep supervision through time on LSUN
dataset for RoomNets with 2 and 3 recurrent iterations.

| Model | Keypoint Error (%) | Pixel Error (%) |
|---|---|---|
| RoomNet recurrent 2-iteration | | |
| w/o deep supervision through time | 6.93 | 10.44 |
| w/ deep supervision through time | 6.65 | 9.97 |
| RoomNet recurrent 3-iteration | | |
| w/o deep supervision through time | 6.95 | 10.47 |
| w/ deep supervision through time | 6.30 | 9.86 |

Runtime and complexity. Efficiency evaluation on the input image size of 320×320 is shown in Table 3. The full model (RoomNet recurrent 3 iteration) achieved 200× speedup compares another method of room layout estimation, and the base RoomNet without recurrent structure (RoomNet basic) achieved 600× speedup. The timing was for two forward passes as described herein. Using either one of the proposed RoomNet 300 can provide significant inference time reduction and an improved accuracy as shown in Table 4.

Example RoomNet Analysis

Recurrent vs. direct prediction. The effect of each component in the RoomNet architecture was investigated with the LSUN dataset. Table 4 shows the effectiveness of extending the RoomNet basic architecture to a memory augmented recurrent encoder-decoder networks. It was observed that more iterations led to lower error rates on both keypoint error and pixel error: the RoomNet 300 with recurrent structure that iteratively regressed to correct keypoint locations achieved 6.3% keypoint error and 9.86 pixel error as compared to the RoomNet 300 without recurrent structure which achieved 6.95% keypoint error and 10.46 pixel error. No further significant performance improvement was observed after three iterations. Without being limited by the theory, the improvement may come from the same parametric capacity within the networks since the weights of convolutional layers are shared across iterations.

Effect of deep supervision through time. When applying a recurrent structure with an encoder-decoder architecture, each layer in the network receives gradients not only across depth but also through time steps between the input and the final objective function during training. The effect of adding auxiliary loss functions at different time steps was determined. Table 5 demonstrates the impact of deep supervision through time using RoomNet 300 with two or three recurrent iterations. Immediate reduction in both keypoint error and pixel error by adding auxiliary losses for both cases. In some embodiments, the learning problem with deep supervision can be easier through different time steps. The RoomNet 300 with three iterations in time performed worse than RoomNet 300 with two iterations when deep supervision through time was not applied. This was rectified when deep supervision through time was applied. In some embodiments, with more iterations in the recurrent structure, deep supervision through time can be applied to successfully train the architecture.

Qualitative results. Qualitative results of the RoomNet 300 are shown in FIGS. 7A-7G. FIGS. 7A-7G are images showing example RoomNet predictions and the corresponding ground truth on the Large-scale Scene Understanding Challenge (LSUN) dataset. A RoomNet took an RGB image as its input 704a-704g (drawn in the first column in each figure) and produced an example room layout keypoint heat map 708a-708g (second column in each figure). The final keypoints were obtained by extracting the location with maximum response from the heat map. The third and fourth columns in each figure show example boxy room layout representations 712a-712fg 716a-716g by connecting the obtained keypoints in a specific order as in FIG. 2. The different surfaces in the third column are shown in different cross-hatch patterns, which can result from a segmentation of the layout to identify a ceiling, a floor, walls, etc. The RoomNet room layout output 712a-712g shows the floor, ceiling, and walls in different cross-hatches. In representations 716a-716g, the room layout is superimposed on the respective input image 704a-704g. The fifth and sixth columns in each figure show example ground truths 720a-720g, 724a-724g for the actual room layouts. The correspondences between the room layouts 712a-712g and 716a-716g (determined by RoomNet) and the actual ground truth layouts 720a-720g and 724a-724g is striking. These example results demonstrate that RoomNet is robust to keypoint occlusion by objects (e.g., tables, chairs, beds, etc.). When the image was clean and the room layout boundaries/corners were not occluded, the RoomNet 300 can recover the boxy room layout representation with high accuracy. The RoomNet framework was also robust to keypoint occlusion by objects (e.g., tables, chairs, beds, etc.), demonstrated in, e.g., FIGS. 7B, 7C, 7D, 7F.

FIGS. 8A-8D are example images showing examples where the room layout predictions from an embodiment of RoomNet are less good matches to the ground truth layouts. The differences between the RoomNet predictions and the ground truth can be further reduced or eliminated as described herein. The first column in each figure shows an example input image 804a-804d. The second column in each figure shows an example predicted keypoint heat map 808a-808d. The third and fourth columns in each figure show example boxy representations obtained 812a-812d, 816a-816d. The different surfaces in the third column are shown in different cross-hatch patterns, which can result from a segmentation of the layout to identify a ceiling, a floor, walls, etc. The fifth and sixth columns show example ground truths 820a-820d, 824a-824d. Further improvements of the RoomNet 300 may be possible when room layout boundaries are barely visible (e.g., FIGS. 8A and 8C), or when there is more than one plausible room layout for a given image of a scene (e.g., FIGS. 8B and 8D).

Example Alternative Encoder-Decoder

The effect of each component in the proposed architecture with the LSUN dataset was empirically determined. An evaluation of six alternative encoder-decoder architectures shown in FIGS. 9A-9F for the room layout estimation task investigated included: (a) a vanilla encoder/decoder 900a (RoomNet basic), shown in FIG. 9A; (b) a stacked encoder-decoder 900b, shown in FIG. 9B, (c) a stacked encoder-decoder with skip-connections 900c, shown in FIG. 9C; (d) an encoder-decoder with feedback 900d, shown in FIG. 9D; (e) memory augmented recurrent encoder-decoder (RoomNet full) 900e, shown in FIG. 9E; and (f) a memory augmented recurrent encoder-decoder with feedback 900f, shown in FIG. 9F. Some embodiments of the RoomNet 300 may have advantages over other embodiments of the RoomNet 300 for certain tasks; for example, some embodiments of RoomNet can reduce or eliminate the differences shown in FIGS. 8A-8D. Table 6 shows the performance of different variants on LSUN dataset.

TABLE 6

Evaluation of encoder-decoder (enc-dec) variants
on LSUN dataset.

| Model | Keypoint Error (%) | Pixel Error (%) |
|---|---|---|
| Vanilla enc-dec (RoomNet basic) | 6.95 | 10.46 |
| Stacked enc-dec | 6.82 | 10.31 |
| Stacked enc-dec with skip connect. | 7.05 | 10.48 |
| Enc-dec w/ feedback | 6.84 | 10.10 |
| Recurrent enc-dec (RoomNet full) | 6.30 | 9.86 |
| Recurrent enc-dec w/ feedback | 6.37 | 9.88 |

Note
that recurrent encoder-decoders use three iteration time steps.

The comparison of the (a) and (b) configurations 900a, 900b indicates that stacking encoder-decoder networks can further improve the performance, as the network is enforced to learn the spatial structure of the room layout keypoints implicitly by placing constraints on multiple bottleneck layers.

However, adding skip connections as in the (c) configuration 900c did not improve the performance for this task under the conditions tested. This could be because the size of the training set (thousands) was not as large as other datasets (millions) that had been evaluated on, therefore skipping layers was not necessary for the specific dataset.

Adding a feedback loop, implemented as a concatenation of input and previous prediction as a new input for the same encoder-decoder network as in the (d) configuration 900d improved the performance. At each iteration, the network had access to the thus-far sub-optimal prediction along with the original input to help inference at the current time step.

Making an encoder-decoder recurrent with memory units in the (e) configuration 900e to behave as a RNN obtains the lowest keypoint error and pixel error (the full RoomNet model). The lateral connections in the recurrent encoder-decoder allowed the network to carry information forward and help prediction at future time steps. Adding a feedback loop to the memory augmented recurrent encoder-decoder in the (f) configuration 900f did not improve the results. It was possible that using the memory augmented structure in the configuration (e) 900e can already store previous hidden state information well without feedback. Weight matrices of the encoder-decoder were not shared in the (b) and (c) configurations 900b, 900c but shared in the (d), (e), and (f) configurations 900d, 900e, 900f, resulting in more parametrically efficient architectures.

Feature transferring by pre-training. To decouple the performance gains due to external data, results of fine-tuning the RoomNet from a SUN pre-trained model (on semantic segmentation task) were determined. As shown in Table 7, such a RoomNet achieved 6.09% keypoint error and 9.04% pixel error as compared of other methods with at least 7.95% keypoint error and 9.31% pixel error on the LSUN dataset. Table 7 reflects room layout estimation results with extra data or pre-trained models. In some embodiments, a RoomNet can be trained using an additional Hedau+ training set and fine-tuned from NYUDv2 RGBD (RGB plus Depth) pre-trained models. Table 7 shows the results of fine-tuning from PASCAL and SUN pre-trained RoomNet. The SUN pre-trained RoomNet achieved lowest keypoint error and pixel error on LSUN dataset.

TABLE 7

Evaluation of methods with pre-training
techniques on LSUN dataset.

| Model | Keypoint Error (%) | Pixel Error (%) |
|---|---|---|
| Ren et al. | 7.95 | 9.31 |
| Room Net recurrent 3-iterations | | |
| with PASCAL pre-training | 6.43 | 9.16 |
| With SUN pre-training | 6.09 | 9.04 |

In some embodiments, a RoomNet 300 can include a gating mechanism to allow incoming signal to alter the state of recurrent units. In some embodiments, a RoomNet 300 can be trained using sequential data and/or predict building room layout maps using sequential data.

Example Process of Training a RoomNet

Figure 10:
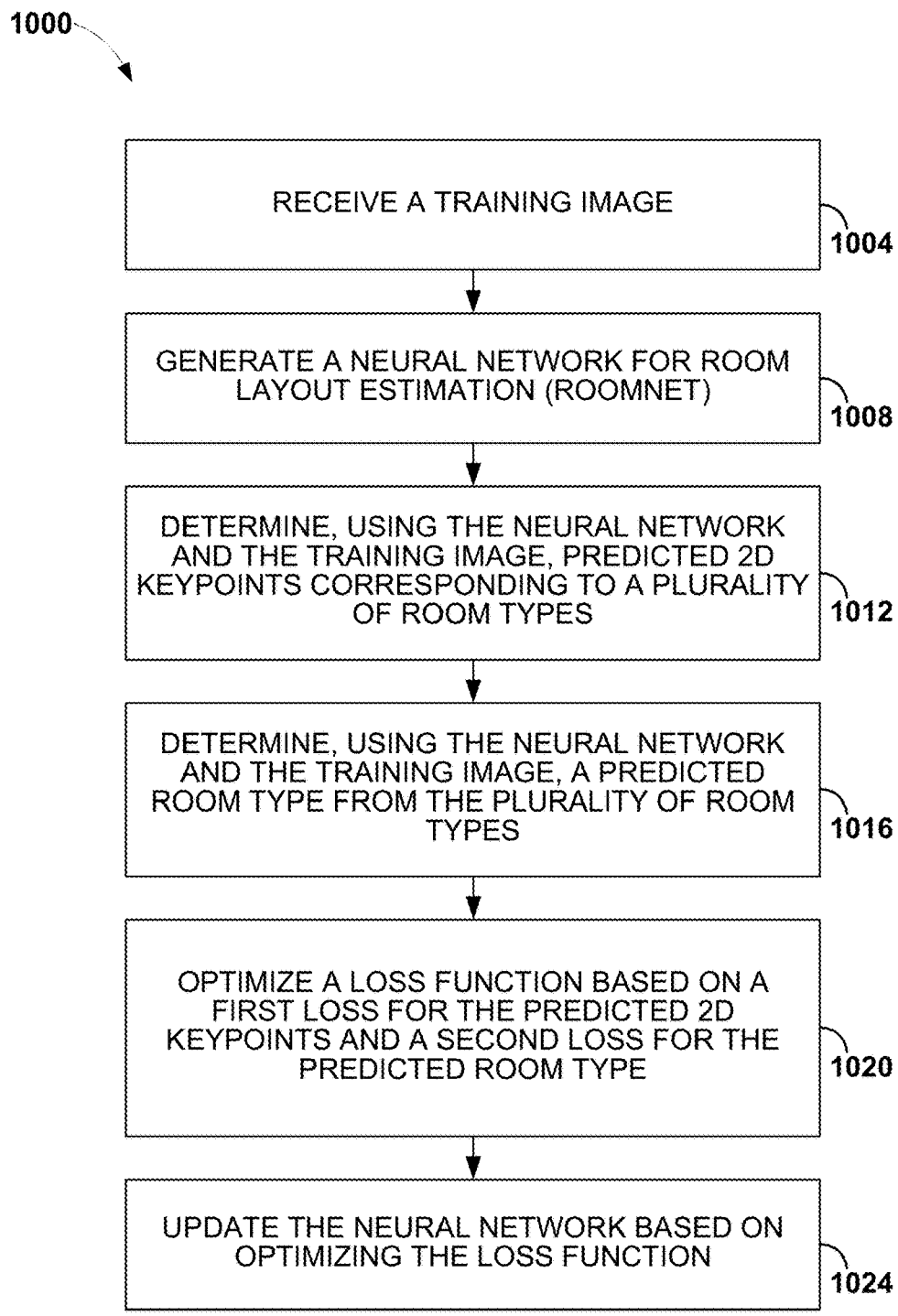
FIG. 10 is a flow diagram of an example process of training a RoomNet.

FIG. 10 is a flow diagram of an example process 1000 of training a RoomNet. The process 1000 can be performed by a hardware processor comprising non-transitory memory configured to store images, the RoomNet architecture and parameters (e.g., NN weights), room types, 2D keypoint locations (e.g., heat maps), room layouts, and so forth.

The process 1000 starts at block 1004, where training room images for many types of rooms and room types are received. Each of the training room images can be associated with a reference room type and a reference keypoints that identify the room layout (e.g., floor, ceiling, wall(s)). In some cases, the training images are annotated by hand to indicate the ground truth (e.g., keypoint location and room type) for the room shown in the image. A training room image can be a monocular image, an Red-Green-Blue (RGB) image, etc. Training images are obtainable from the Hedau dataset or the LSUN dataset.

The process 1000 can include performing a data augmentation strategy (e.g., augmenting the training data with horizontally flipped images) to improve the performance of a trained RoomNet. The number of room types can be different in different implementations, such as 2, 3, 5, 10, 11, 15, 20, or more. A room type can be associated with a plurality of keypoints associated with a keypoint order. The keypoints can be connected in the keypoint order to provide a room layout. The number of keypoints can be different in different implementations, such as 2, 3, 5, 6, 8, 10, 20, 50, or more.

At block 1008, a neural network for room layout estimation (e.g., RoomNet) can be generated. As described herein, an embodiment of RoomNet can comprise: an encoder sub-network, a decoder sub-network connected to the encoder network, and a side head or sub-network connected to the encoder network. The encoder sub-network can comprise a plurality of convolutional layers and a plurality of pooling layers. The decoder sub-network can comprise a plurality of convolutional layers and a plurality of upsampling layers. Weights of a decoder layer of the decoder sub-network can comprise weights of a corresponding encoder layer of the encoder sub-network. Alternatively, or additionally, weights of a decoder layer of the decoder sub-network can be identical to weights of a corresponding encoder layer of the encoder sub-network. In some embodiments, the encoder sub-network and the decoder sub-network comprises a plurality of recurrent layers to form a recurrent encoder-decoder structure (e.g., a memory-augmented recurrent encoder-decoder (MRED) network). A number of recurrent iterations of the recurrent layers can be 2, 3, 5, 10, or more. In some embodiments, weights associated with a first recurrent iteration of the iterations of the recurrent layers are identical to weights associated with a second recurrent iteration of the current layers.

The encoder sub-network and decoder sub-network can have different architectures in different implementations. For example, the encoder sub-network and the decoder sub-network can have a stacked encoder-decoder architecture. As another example, the encoder sub-network and the decoder sub-network can have a stacked encoder-decoder architecture with skip-connections. As yet another example, the encoder sub-network and the decoder sub-network can have a stacked encoder-decoder architecture with feedback. In one example, the encoder sub-network and the decoder sub-network has a memory augmented recurrent encoder-decoder (MRED) architecture. In another example, the encoder sub-network and the decoder sub-network has a memory augmented recurrent encoder-decoder (MRED) architecture with feedback. Feature maps of a RoomNet with a recurrent layer can be determined using Equation [2] in some embodiments.

At block 1012, a plurality of predicted 2D keypoints for each of the room types can be determined using the encoder sub-network and the decoder sub-network of the RoomNet and the training room image. A dimensionality of the training room image can be smaller, the same, or larger than a dimensionality of a predicted heat map. The 2D keypoint locations can in some cases be extracted from heat maps (e.g., as maxima in the heat maps).

At block 1016, a predicted room type can be determined using the encoder sub-network and the side sub-network of the RoomNet and the training room image. For example, side sub-network can comprise a plurality of layers, such as fully-connected layers. In some embodiments, the side sub-network comprises three fully-connected layers. The dimensionality of the output layer of the side sub-network and the number of the plurality of room types can be identical.

At block 1020, the process 1000 can optimize (e.g., reduce or minimize) a loss function based on a first loss representing errors in the predicted keypoints relative to the reference keypoints in the training image and a second loss representing an error in the predicted room type relative to the reference room type in the training image. An example of a loss function L is described with reference to Equation [1]. The first loss can be a Euclidean loss between the predicted keypoints and the reference keypoints. In some implementations, the predicted keypoints are represented by a heat map and a reference heat map for the reference (e.g., ground truth) keypoints can be generated by placing a Gaussian centered on the reference keypoint locations. The first loss can be set up to penalize a predicted keypoint only if the keypoint is present for the reference room type in the input training image. The second loss can be a cross-entropy (e.g., logarithmic) loss based on a room type classifier (e.g., output from the room type side sub-network) that encourages the side sub-network to produce a high confidence value with respect to the correct room type.

In some embodiments, determining the first loss comprises determining a reference heat map using the reference keypoints and determining a difference between the reference heat map and a predicted heat map for the predicted keypoints. The reference heat map can comprise a distribution centered around each reference keypoint location. The distribution can comprise a two-dimensional Gaussian distribution. The Gaussian distribution can have a standard deviation of, for example, 2, 3, 5, 10, or more pixels. The Gaussian distribution can have a standard deviation of a percentage of a dimension of the reference heat map, such as 5%, 10%, 20%, 25%, or more. In some embodiments, determining the reference heat map can comprise degrading values of pixels that are a threshold number of pixels away from the reference keypoint locations, for example, by multiplying the pixel values by a degrading factor less than one, such as 0.1, 0.2, 0.3.

At block 1024, neural network parameters for the RoomNet can be updated based on the optimized loss function. In some embodiments, weights of the RoomNet can be updated by back propagation.

The process 1000 can be iterated for each of the training images in the training image set (e.g., the Hedau or LSUN datasets) to tune the neural network to produce a robust neural network model with reduced or minimized errors (e.g., pixel errors or keypoint errors as described above). An embodiment of RoomNet can be trained using the process 1000 and then applied to real-world images in augmented or mixed reality, indoor navigation, scene reconstruction or rendering, etc.

Example Process of Using a RoomNet for Room Layout Estimation

Figure 11:
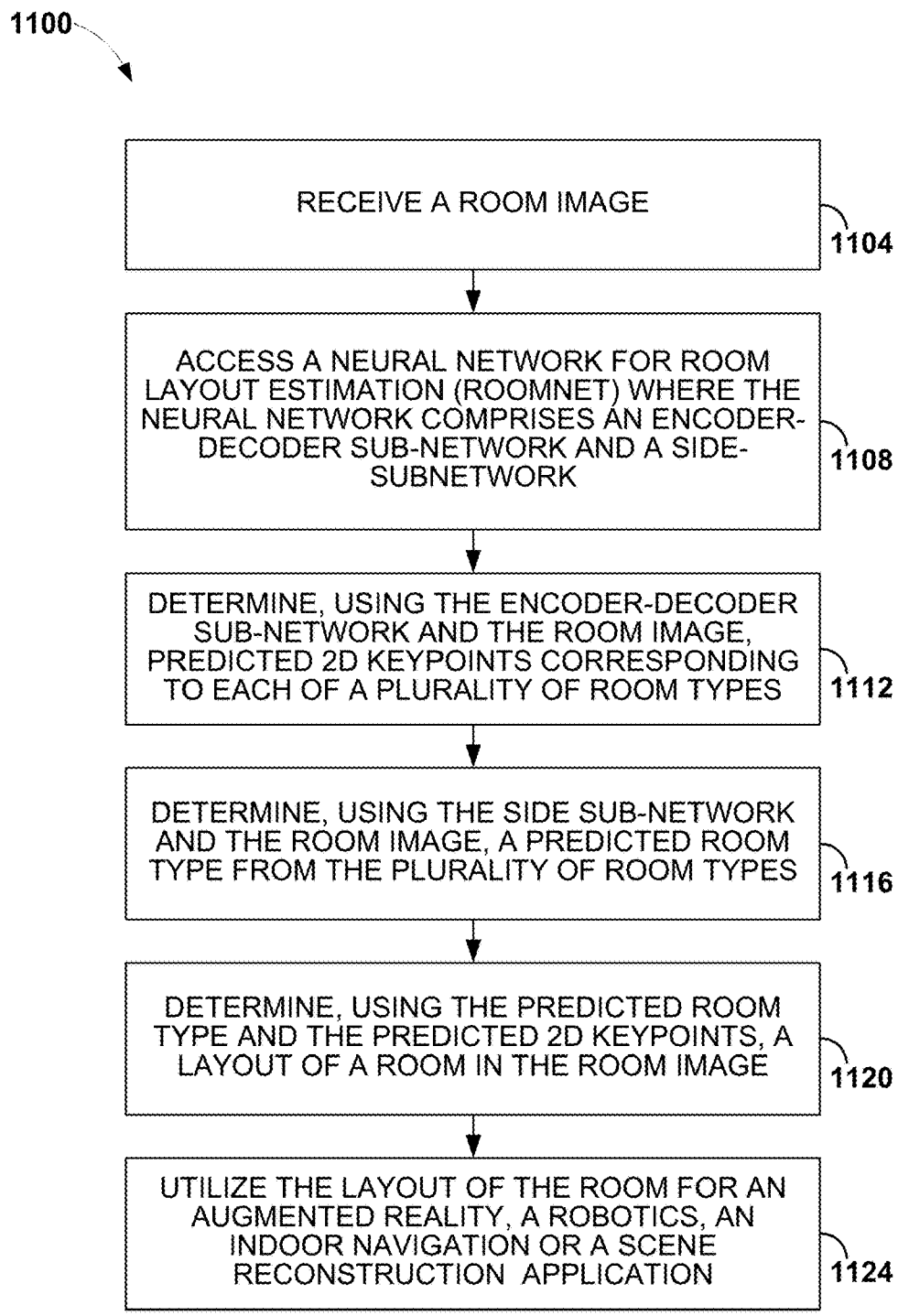
FIG. 11 is a flow diagram of an example process of using a RoomNet for room layout estimation.

FIG. 11 is a flow diagram of an example process 1100 of using a RoomNet for estimating a room layout from a room image. The process 1100 can be performed by a hardware processor comprising non-transitory memory configured to store images, the RoomNet architecture and parameters (e.g., NN weights), room layout types, heat maps, room layouts, and so forth. As described below with reference to FIG. 12, the wearable display system 1200 or a robotics system can be configured to implement an embodiment of the process 1100.

The process 1100 starts at block 1104, where a system (e.g., the wearable display system 1200 described with reference to FIG. 12) receives an input image including a possible room scene. The image can include one room scene. The image can comprise a color image (e.g., RGB or RGB-D) and the image may be monocular. The image may be a frame of a video and may be obtained using the outward-facing imaging system 1244 of the wearable display system 1200 described with reference to FIG. 12.

At block 1108, the wearable display system 1200 can access a neural network for room layout estimation (RoomNet), such as the RoomNet trained by the process 1000 illustrated in FIG. 10. The RoomNet can include an encoder sub-network, a decoder sub-network connected to the encoder network, and a side sub-network connected to the encoder network. In some embodiments, the encoder sub-network and the decoder sub-network comprises a plurality of recurrent layers. For example, the encoder-decoder sub-network can comprise a memory-augmented recurrent encoder-decoder (MRED) network. Feature maps of a RoomNet with a recurrent layer can be determined using Equation [2] above. The architectures of the RoomNet can be different in different implementations. For example, the encoder sub-network and the decoder sub-network can comprise a stacked encoder-decoder architecture. As another example, the encoder sub-network and the decoder sub-network can comprise a plurality of skip connections. In one example, the side sub-network comprises a plurality of feedback layers.

At block 1112, the process 1100, using the encoder sub-network and the decoder sub-network of the RoomNet and the room image, can determine a plurality of 2D keypoints corresponding to each of a plurality of room types. The 2D keypoints can be associated with a heat map, and keypoint locations can be extracted from the heat map as maxima that occur in the heat map. The number of room types can be greater than 5 (e.g., 11 in some cases).

At block 1116, the wearable display system 1200 can determine, using the side sub-network of the RoomNet and the room image, a predicted room type from the plurality of room types.

At block 1120, the process 1100 can determine a layout of the room in the room image from the predicted room type and the 2D keypoints. The room layout can comprise ordered keypoints having a keypoint order associated with the predicted room type. The number of the keypoints can be different in different implementations, such as 2, 3, 4, 6, 8, 10, or more. The room layout can comprise a semantic segmentation of layout surfaces such as an identification of a layout surface as a ceiling, a floor, a wall, etc. The semantic segmentation can be derived from the ordered 2D keypoints. Accordingly, the neural network can provide a 3D room layout structure using the 2D keypoints, which can be in a specific order with an associated room type.

At block 1124, the process 1100 can utilize the room layout in an augmented or mixed reality application, for autonomous indoor navigation, for scene reconstruction or rendering, etc.

The wearable display system 1200 (described with reference to FIG. 12 below) can interact with a user of the system based on the predicted layout of the room in the input image. In some embodiments, the wearable display system 1200 can perform indoor navigation based on the predicted layout of a room in the room image, for example, to direct the user to a desired location in the room (e.g., by rendering the room layout and (optionally) a path to the location). In other embodiments, the wearable display system 1200 can reconstruct a scene in the room image based on the predicted layout of the room in the room image.

Example NN Layers

As described above, embodiments of RoomNet can comprise a neural network. A layer of a neural network (NN), such as a deep neural network (DNN) can apply a linear or non-linear transformation to its input to generate its output. A deep neural network layer can be a normalization layer, a convolutional layer, a softsign layer, a rectified linear layer, a concatenation layer, a pooling layer, a recurrent layer, an inception-like layer, or any combination thereof. The normalization layer can normalize the brightness of its input to generate its output with, for example, Euclidean or L2 normalization. The normalization layer can, for example, normalize the brightness of a plurality of images with respect to one another at once to generate a plurality of normalized images as its output. Non-limiting examples of methods for normalizing brightness include local contrast normalization (LCN) or local response normalization (LRN). Local contrast normalization can normalize the contrast of an image non-linearly by normalizing local regions of the image on a per pixel basis to have a mean of zero and a variance of one (or other values of mean and variance). Local response normalization can normalize an image over local input regions to have a mean of zero and a variance of one (or other values of mean and variance). The normalization layer may speed up the training process.

The convolutional layer can apply a set of kernels that convolve its input to generate its output. The softsign layer can apply a softsign function to its input. The softsign function (softsign(x)) can be, for example, $(x/(1+|x|))$. The softsign layer may neglect impact of per-element outliers. The rectified linear layer can be a rectified linear layer unit (ReLU) or a parameterized rectified linear layer unit (PReLU). The ReLU layer can apply a ReLU function to its input to generate its output. The ReLU function ReLU(x) can be, for example, $\max(0, x)$. The PReLU layer can apply a PReLU function to its input to generate its output. The PReLU function PReLU(x) can be, for example, x if x≥0 and ax if x<0, where a is a positive number. The concatenation layer can concatenate its input to generate its output. For example, the concatenation layer can concatenate four 5×5 images to generate one 20×20 image. The pooling layer can apply a pooling function which down samples its input to generate its output. For example, the pooling layer can down sample a 20×20 image into a 10×10 image. Non-limiting examples of the pooling function include maximum pooling, average pooling, or minimum pooling.

At a time point t, the recurrent layer can compute a hidden state s(t), and a recurrent connection can provide the hidden state s(t) at time t to the recurrent layer as an input at a subsequent time point t+1. The recurrent layer can compute its output at time t+1 based on the hidden state s(t) at time t. For example, the recurrent layer can apply the softsign function to the hidden state s(t) at time t to compute its output at time t+1. The hidden state of the recurrent layer at time t+1 has as its input the hidden state s(t) of the recurrent layer at time t. The recurrent layer can compute the hidden state s(t+1) by applying, for example, a ReLU function to its input. The inception-like layer can include one or more of the normalization layer, the convolutional layer, the softsign layer, the rectified linear layer such as the ReLU layer and the PReLU layer, the concatenation layer, the pooling layer, or any combination thereof.

The number of layers in the NN can be different in different implementations. For example, the number of layers in the DNN can be 50, 100, 200, or more. The input type of a deep neural network layer can be different in different implementations. For example, a layer can receive the outputs of a number of layers as its input. The input of a layer can include the outputs of five layers. As another example, the input of a layer can include 1% of the layers of the NN. The output of a layer can be the inputs of a number of layers. For example, the output of a layer can be used as the inputs of five layers. As another example, the output of a layer can be used as the inputs of 1% of the layers of the NN.

The input size or the output size of a layer can be quite large. The input size or the output size of a layer can be n×m, where n denotes the width and m denotes the height of the input or the output. For example, n or m can be 11, 21, 31, or more. The channel sizes of the input or the output of a layer can be different in different implementations. For example, the channel size of the input or the output of a layer can be 4, 16, 32, 64, 128, or more. The kernel size of a layer can be different in different implementations. For example, the kernel size can be n×m, where n denotes the width and m denotes the height of the kernel. For example, n or m can be 5, 7, 9, or more. The stride size of a layer can be different in different implementations. For example, the stride size of a deep neural network layer can be 3, 5, 7 or more.

In some embodiments, a NN can refer to a plurality of NNs that together compute an output of the NN. Different NNs of the plurality of NNs can be trained for different tasks. A processor (e.g., a processor of the local data processing module 1224 descried with reference to FIG. 12) can compute outputs of NNs of the plurality of NNs to determine an output of the NN. For example, an output of a NN of the plurality of NNs can include a likelihood score. The processor can determine the output of the NN including the plurality of NNs based on the likelihood scores of the outputs of different NNs of the plurality of NNs.

Example Wearable Display System

In some embodiments, a user device can be, or can be included, in a wearable display device, which may advantageously provide a more immersive virtual reality (VR), augmented reality (AR), or mixed reality (MR) experience, where digitally reproduced images or portions thereof are presented to a wearer in a manner wherein they seem to be, or may be perceived as, real.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. For example, displays containing a stack of waveguides may be configured to be worn positioned in front of the eyes of a user, or viewer. The stack of waveguides may be utilized to provide three-dimensional perception to the eye/brain by using a plurality of waveguides to direct light from an image injection device (e.g., discrete displays or output ends of a multiplexed display which pipe image information via one or more optical fibers) to the viewer's eye at particular angles (and amounts of divergence) corresponding to the depth plane associated with a particular waveguide.

In some embodiments, two stacks of waveguides, one for each eye of a viewer, may be utilized to provide different images to each eye. As one example, an augmented reality scene may be such that a wearer of an AR technology sees a real-world park-like setting featuring people, trees, buildings in the background, and a concrete platform. In addition to these items, the wearer of the AR technology may also perceive that he "sees" a robot statue standing upon the real-world platform, and a cartoon-like avatar character flying by which seems to be a personification of a bumble bee, even though the robot statue and the bumble bee do not exist in the real world. The stack(s) of waveguides may be used to generate a light field corresponding to an input image and in some implementations, the wearable display comprises a wearable light field display. Examples of wearable display device and waveguide stacks for providing light field images are described in U.S. Patent Publication No. 2015/0016777, which is hereby incorporated by reference herein in its entirety for all it contains.

Figure 12:
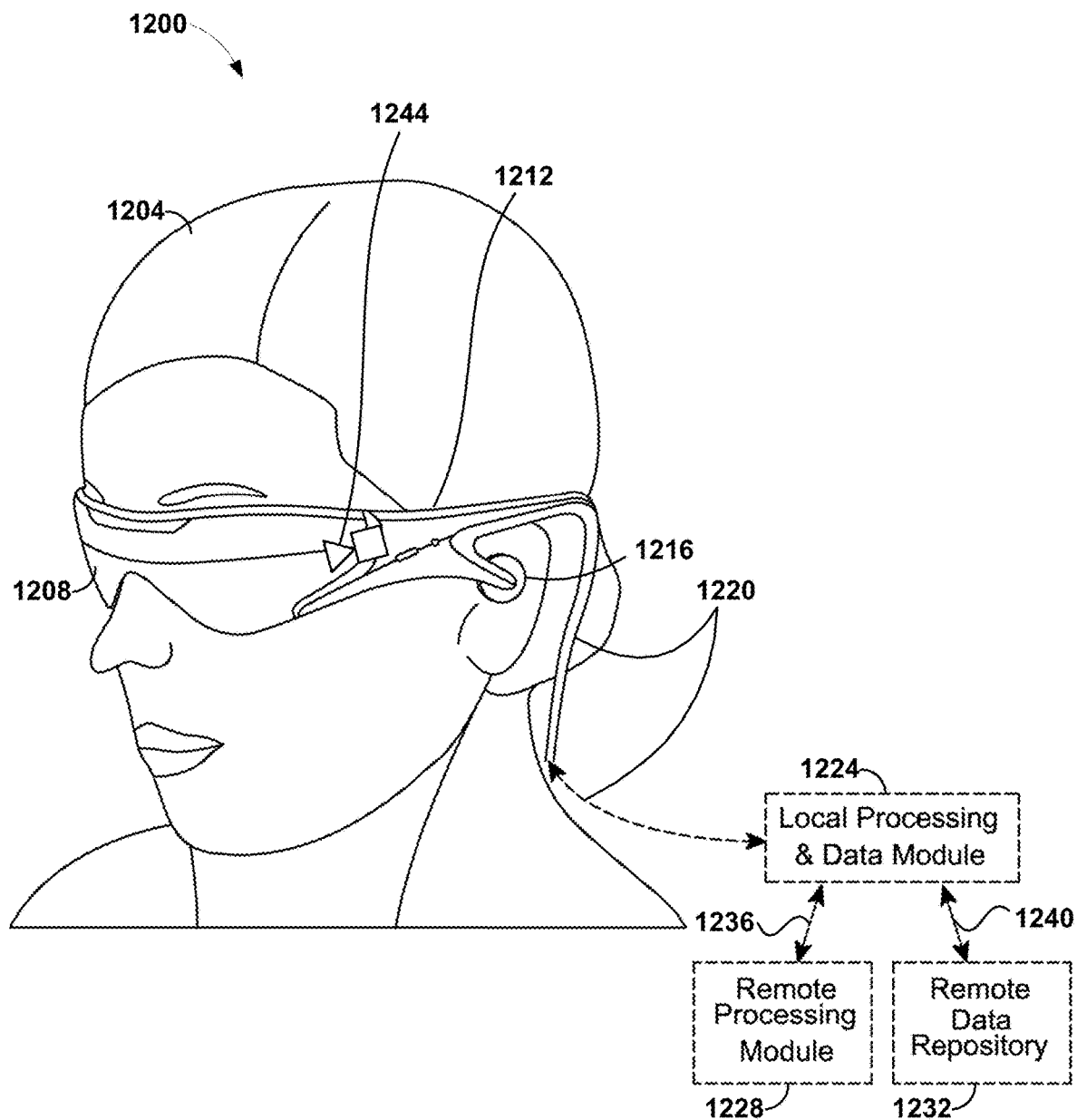
FIG. 12 schematically illustrates an example of a wearable display system, which can implement an embodiment of RoomNet.

FIG. 12 illustrates an example of a wearable display system 1200 that can be used to present a VR, AR, or MR experience to a display system wearer or viewer 1204. The wearable display system 1200 may be programmed to perform any of the applications or embodiments described herein (e.g., estimating a room layout using RoomNet). The display system 1200 includes a display 1208, and various mechanical and electronic modules and systems to support the functioning of that display 1208. The display 1208 may be coupled to a frame 1212, which is wearable by the display system wearer or viewer 1204 and which is configured to position the display 1208 in front of the eyes of the wearer 1204. The display 1208 may be a light field display. In some embodiments, a speaker 1216 is coupled to the frame 1212 and positioned adjacent the ear canal of the user in some embodiments, another speaker, not shown, is positioned adjacent the other ear canal of the user to provide for stereo/shapeable sound control. The display system 1200 can include an outward-facing imaging system 1244 (e.g., one or more cameras) that can obtain images (e.g., still images or video) of the environment around the wearer 1204. Images obtained by the outward-facing imaging system 1244 can be analyzed by embodiments of RoomNet to determine a representation of a room layout in the environment around the wearer 1204.

The display 1208 is operatively coupled 1220, such as by a wired lead or wireless connectivity, to a local data processing module 1224 which may be mounted in a variety of configurations, such as fixedly attached to the frame 1212, fixedly attached to a helmet or hat worn by the user, embedded in headphones, or otherwise removably attached to the user 1204 (e.g., in a backpack-style configuration, in a belt-coupling style configuration).

The local processing and data module 1224 may comprise a hardware processor, as well as non-transitory digital memory, such as non-volatile memory e.g., flash memory, both of which may be utilized to assist in the processing, caching, and storage of data. The data include data (a) captured from sensors (which may be, e.g., operatively coupled to the frame 1212 or otherwise attached to the wearer 1204), such as image capture devices (such as cameras), microphones, inertial measurement units, accelerometers, compasses, GPS units, radio devices, and/or gyros; and/or (b) acquired and/or processed using remote processing module 1228 and/or remote data repository 1232, possibly for passage to the display 1208 after such processing or retrieval. The local processing and data module 1224 may be operatively coupled to the remote processing module 1228 and remote data repository 1232 by communication links 1236, 1240, such as via a wired or wireless communication links, such that these remote modules 1228, 1232 are operatively coupled to each other and available as resources to the local processing and data module 1224. The image capture device(s) can be used to capture the eye images used in the eye image segmentation, or eye tracking procedures.

In some embodiments, the remote processing module 1228 may comprise one or more processors configured to analyze and process data and/or image information such as video information captured by an image capture device (e.g., by performing RoomNet). The video data may be stored locally in the local processing and data module 1224 and/or in the remote data repository 1232. In some embodiments, the remote data repository 1232 may comprise a digital data storage facility, which may be available through the internet or other networking configuration in a "cloud" resource configuration. In some embodiments, all data is stored and all computations are performed in the local processing and data module 1224, allowing fully autonomous use from a remote module.

In some implementations, the local processing and data module 1224 and/or the remote processing module 1228 are programmed to perform embodiments of RoomNet to determine room layout. For example, the local processing and data module 1224 and/or the remote processing module 1228 can be programmed to perform embodiments of the process 1100 described with reference to FIG. 11. The local processing and data module 1224 and/or the remote processing module 1228 can be programmed to perform the room layout estimation method 1100 disclosed herein. The image capture device can capture video for a particular application (e.g., augmented reality (AR) or mixed reality (MR), human-computer interaction (HCI), autonomous vehicles, drones, or robotics in general). The video (or one or more frames from the video) can be analyzed using an embodiment of the computational RoomNet architecture by one or both of the processing modules 1224, 1228. In some cases, off-loading at least some of the RoomNet analysis to a remote processing module (e.g., in the "cloud") may improve efficiency or speed of the computations. The parameters of the RoomNet neural network (e.g., weights, bias terms, subsampling factors for pooling layers, number and size of kernels in different layers, number of feature maps, room layout types, keypoint heat maps, etc.) can be stored in data modules 1224 and/or 1232.

The results of the RoomNet analysis (e.g., the output of the method 1100) can be used by one or both of the processing modules 1224, 1228 for additional operations or processing. For example, the processing modules 1224, 1228 of the wearable display system 1200 can be programmed to perform additional applications, such as augmented or mixed reality, indoor navigation, or scene reconstruction or rendering, based on the output of the method 1100. Accordingly, the wearable system 200 can use RoomNet to provide room layouts in real-time.

For example, the wearable display system 1200 can utilize a world map (e.g., stored in the local or remote data repositories 1224, 1240) that describes where objects, walls, floors, ceiling, doors, etc. are located relative to each other in a mixed reality environment. Further details regarding use of the world map are described in U.S. Patent Publication No. 2015/0016777, which is hereby incorporated by reference herein for all it contains. The output of RoomNet (e.g., the output of the method 1100) can be used to update the world map to include a room layout for a room in which the wearer of the system 1200 is located.

The RoomNet architecture can be used with other object recognizers or deep learning systems that analyze images for objects in the user's environment. For example, U.S. patent application Ser. No. 15/812,928, filed Nov. 14, 2017, entitled Deep Learning System for Cuboid Detection, which is hereby incorporated by reference herein in its entirety for all it contains, describes machine learning techniques to detect 3D cuboid-shaped objects in images. In some embodiments, the RoomNet architecture can be used to identify the room layout and the cuboid-detection architecture can be used to identify or localize cuboidal objects within the room layout. This information can be added to the world map of the wearable display system 1200 to provide an improved AR or MR user experience.

As yet another example, a robot can utilize embodiments of RoomNet to determine a room layout and then use the room layout for automated navigation of the robot within the room. Robots can include autonomous indoor robots (e.g., robotic vacuum cleaners, mops, sweepers), warehouse robots (e.g., used for automatic storage, retrieval, and inventory operations), indoor aerial drones, etc.

Additional Aspects

In a 1st aspect, a system for estimating a layout of a room is disclosed. the system comprises: non-transitory memory configured to store: a room image for room layout estimation; and a neural network for estimating a layout of a room, the neural network comprising: an encoder-decoder sub-network; and a classifier sub-network connected to the encoder-decoder sub-network; a hardware processor in communication with the non-transitory memory, the hardware processor programmed to: access the room image; determine, using the encoder-decoder sub-network and the room image, a plurality of predicted two-dimensional (2D) keypoint maps corresponding to a plurality of room types; determine, using the encoder-decoder sub-network, the classifier sub-network and the room image, a predicted room type from the plurality of room types; determine, using the plurality of predicted 2D keypoint maps and the predicted room type, a plurality of ordered keypoints associated with the predicted room type; and determine, using the plurality of ordered keypoints, a predicted layout of the room in the room image.

In a 2nd aspect, the system of aspect 1, wherein each room type in the plurality of room types comprises an ordered set of room type keypoints.

In a 3rd aspect, the system of aspect 2, wherein each room type in the plurality of room types comprises a semantic segmentation for regions in the room type, the semantic segmentation comprising an identification as a floor, a ceiling, or a wall.

In a 4th aspect, the system of aspect 2 or aspect 3, wherein a first keypoint order is associated with a first room type of the plurality of room types and a second keypoint order is associated with a second room type of the plurality of room types, wherein the first keypoint order and the second keypoint order are different.

In a 5th aspect, the system of any one of aspects 1 to 4, wherein the room image comprises a monocular image.

In a 6th aspect, the system of any one of aspects 1 to 5, wherein the room image comprises a Red-Green-Blue (RGB) image.

In a 7th aspect, the system of any one of aspects 1 to 6, wherein a dimensionality of the room image is larger than a dimensionality of the predicted 2D keypoint maps.

In an 8th aspect, the system of any one of aspects 1 to 7, wherein the encoder-decoder sub-network comprises an encoder sub-network comprising a plurality of convolutional layers and a plurality of pooling layers.

In a 9th aspect, the system of any one of aspects 1 to 8, wherein the encoder-decoder sub-network comprises a decoder sub-network comprising a plurality of convolutional layers and a plurality of upsampling layers.

In a 10th aspect, the system of any one of aspects 1 to 9, wherein the encoder-decoder sub-network comprises a memory augmented recurrent encoder-decoder (MRED) network.

In an 11th aspect, the system of any one of aspects 1 to 10, wherein the encoder-decoder sub-network comprises a plurality of recurrent layers.

In a 12th aspect, the system of aspect 11, wherein a number of recurrent iterations of the plurality of recurrent layers is two.

In a 13th aspect, the system of aspect 11, wherein a number of recurrent iterations of the plurality of recurrent layers is at least three.

In a 14th aspect, the system of any one of aspects 11 to 13, wherein each of the plurality of recurrent layers has a weight matrix, and the weight matrix is the same for all of the plurality of recurrent layers.

In a 15th aspect, the system of any one of aspects 1 to 14, wherein the predicted two-dimensional (2D) keypoint maps comprise heat maps.

In a 16th aspect, the system of aspect 15, wherein the hardware processor is programmed to extract keypoint locations from the heat maps as maxima of the heat map.

In a 17th aspect, the system of any one of aspects 1 to 16, wherein the hardware processor is programmed to: access object information from an object recognizer that analyzes the room image; and combine the object information with the predicted layout of the room.

In an 18th aspect, the system of aspect 17, wherein the object recognizer is configured to detect cuboids in the room image.

In a 19th aspect, a wearable display device is disclosed. The wearable display device comprises: an outward-facing imaging system configured to capture the room image for room layout estimation; and the system of any one of aspects 1 to 18.

In a 20th aspect, a system for training a neural network for estimating a layout of a room. The system comprises: non-transitory memory configured to store parameters for the neural network; and a hardware processor in communication with the non-transitory memory, the hardware processor programmed to: receive a training room image, wherein the training room image is associated with: a reference room type from a plurality of room types, and reference keypoints associated with a reference room layout; generate a neural network for room layout estimation, wherein the neural network comprises: an encoder-decoder sub-network configured to output predicted two-dimensional (2D) keypoints associated with a predicted room layout associated with each of the plurality of room types, and a side sub-network connected to the encoder-decoder network configured to output a predicted room type from the plurality of room types; and optimize a loss function based on a first loss for the predicted 2D keypoints and a second loss for the predicted room type; and update parameters of the neural network based on the optimized loss function.

In a 21st aspect, the system of aspect 20, wherein a number of the plurality of room types is greater than 5.

In a 22nd aspect, the system of aspect 20 or aspect 21, wherein the reference keypoints and the predicted 2D keypoints are associated with a keypoint order.

In a 23th aspect, the system of any one of aspects 20 to 22, wherein a first keypoint order is associated with a first room type of the plurality of room types and a second keypoint order is associated with a second room type of the plurality of room types, wherein the first keypoint order and the second keypoint order are different.

In a 24th aspect, the system of any one of aspects 20 to 23, wherein the training room image comprises a monocular image.

In a 25th aspect, the system of any one of aspects 20 to 24, wherein the training room image comprises a Red-Green-Blue (RGB) image.

In a 26th aspect, the system of any one of aspects 20 to 25, wherein a dimensionality of the training room image is larger than a dimensionality of a map associated with the predicted 2D keypoints.

In a 27th aspect, the system of any one of aspects 20 to 26, wherein the encoder sub-network and the decoder sub-network comprises a plurality of recurrent layers.

In a 28th aspect, the system of aspect 27, wherein a number of recurrent iterations of the recurrent layers is two or three.

In a 29th aspect, the system of aspect 27 or aspect 28, wherein deep supervision is applied to the recurrent layers.

In a 30th aspect, the system of any one of aspects 27 to 29, wherein weights associated with a first recurrent iteration of the iterations of the recurrent layers are identical to weights associated with a second recurrent iteration of the current layers.

In a 31st aspect, the system of any one of aspects 27 to 30, wherein the plurality of recurrent layers are configured as a memory-augmented recurrent encoder-decoder (MRED) network.

In a 32nd aspect, the system of any one of aspects 20 to 31, wherein the side sub-network comprises a room type classifier.

In a 33th aspect, the system of any one of aspects 20 to 32, wherein the first loss for the predicted 2D keypoints comprises a Euclidean loss between the plurality of reference keypoint locations and the predicted 2D keypoints.

In a 34th aspect, the system of any one of aspects 20 to 33, wherein the second loss for the predicted room type comprises a cross entropy loss.

In a 35th aspect, the system of any one of aspects 20 to 34, wherein the predicted 2D keypoints are extracted from a predicted heat map.

In a 36th aspect, the system of aspect 35, wherein hardware processor is programmed to: calculate a reference heat map associated with the reference keypoints of the training image; and calculate the first loss for the predicted 2D keypoints based on a difference between the predicted heat map and the reference heat map.

In a 37th aspect, the system of aspect 36, wherein the reference heat map comprises a two-dimensional distribution centered at a location for each reference keypoint.

In a 38th aspect, the system of aspect 36 or aspect 37, wherein the reference heat map comprises a background away from the reference keypoints and a foreground associated with the reference keypoints, and the hardware processor is programmed to weight gradients in the reference heat map based on a ratio between the foreground and the background.

In a 39th aspect, the system aspect 38, wherein to weight the gradients in the reference heat map, the hardware processor is programmed to degrade values of pixels in the background by a degrading factor less than one.

In a 40th aspect, a wearable display system is disclosed. The system comprises: an outward-facing imaging system configured to obtain a room image of an environment of the wearer of the wearable display system; non-transitory memory configured to store the room image; and a hardware processor in communication with the non-transitory memory, the processor programmed to: access the room image of the environment; and analyze the room image to determine a predicted layout of a room in the room image, wherein to analyze the room image, the processor is programmed to: use a neural network to determine an ordered set of two-dimensional (2D) keypoints associated with a room type for the room in the room image; and provide the room layout based at least partly on the 2D keypoints and the room type.

In a 41st aspect, the wearable display system of aspect 40, wherein the neural network comprises a convolutional encoder-decoder network.

In a 42nd aspect, the wearable display system of aspect 41, wherein the convolutional encoder-decoder network comprises a memory-augmented recurrent encoder-decoder network.

In a 43rd aspect, the wearable display system of any one of aspects 40 to 42, wherein the neural network comprises a classifier configured to determine the room type.

In a 44th aspect, the wearable display system of any one of aspects 40 to 43, wherein the hardware processor is further programmed to extract the ordered set of 2D keypoints from a heat map.

In a 45th aspect, the wearable display system of any one of aspects 40 to 44, wherein the hardware processor is further programmed to: access object information from an object recognizer that analyzes the room image; and combine the object information with the room layout.

In a 46th aspect, a method for estimating a layout of a room is disclosed. The method comprises: accessing a room image for room layout estimation; determining, using an encoder-decoder sub-network of a neural network for estimating a layout of a room and the room image, a plurality of predicted two-dimensional (2D) keypoint maps corresponding to a plurality of room types; determining, using the encoder-decoder sub-network, a classifier sub-network of the neural network connected to the encoder-decoder sub-network, and the room image, a predicted room type from the plurality of room types; determining, using the plurality of predicted 2D keypoint maps and the predicted room type, a plurality of ordered keypoints associated with the predicted room type; and determining, using the plurality of ordered keypoints, a predicted layout of the room in the room image.

In a 47th aspect, the method of aspect 46, wherein each room type in the plurality of room types comprises an ordered set of room type keypoints.

In a 48th aspect, the method of aspect 47, wherein each room type in the plurality of room types comprises a semantic segmentation for regions in the room type, the semantic segmentation comprising an identification as a floor, a ceiling, or a wall.

In a 49th aspect, the method of aspect 47 or aspect 48, wherein a first keypoint order is associated with a first room type of the plurality of room types and a second keypoint order is associated with a second room type of the plurality of room types, wherein the first keypoint order and the second keypoint order are different.

In a 50th aspect, the method of any one of aspects 46 to 49, wherein the room image comprises a monocular image.

In a 51st aspect, the method of any one of aspects 46 to 50, wherein the room image comprises a Red-Green-Blue (RGB) image.

In a 52nd aspect, the method of any one of aspects 46 to 51, wherein a dimensionality of the room image is larger than a dimensionality of the predicted 2D keypoint maps.

In a 53th aspect, the method of any one of aspects 46 to 52, wherein the encoder-decoder sub-network comprises an encoder sub-network comprising a plurality of convolutional layers and a plurality of pooling layers.

In a 54th aspect, the method of any one of aspects 46 to 53, wherein the encoder-decoder sub-network comprises a decoder sub-network comprising a plurality of convolutional layers and a plurality of upsampling layers.

In a 55th aspect, the method of any one of aspects 46 to 54, wherein the encoder-decoder sub-network comprises a memory augmented recurrent encoder-decoder (MRED) network.

In a 56th aspect, the method of any one of aspects 46 to 55, wherein the encoder-decoder sub-network comprises a plurality of recurrent layers.

In a 57th aspect, the method of aspect 56, wherein a number of recurrent iterations of the plurality of recurrent layers is two.

In a 58th aspect, the method of aspect 56, wherein a number of recurrent iterations of the plurality of recurrent layers is at least three.

In a 59th aspect, the method of any one of aspects 56 to 58, wherein each of the plurality of recurrent layers has a weight matrix, and the weight matrix is the same for all of the plurality of recurrent layers.

In a 60th aspect, the method of any one of aspects 46 to 59, wherein the predicted two-dimensional (2D) keypoint maps comprise heat maps.

In a 61th aspect, the method of aspect 60, further comprising extracting keypoint locations from the heat maps as maxima of the heat map.

In a 62th aspect, the method of any one of aspects 46 to 61, further comprising: accessing object information from an object recognizer that analyzes the room image; and combining the object information with the predicted layout of the room.

In a 63th aspect, the method of aspect 62, further comprising: using the object recognizer to detect cuboids in the room image.

In a 64th aspect, a method for training a neural network for estimating a layout of a room is disclosed. The method comprises: receiving a training room image, wherein the training room image is associated with: a reference room type from a plurality of room types, and reference keypoints associated with a reference room layout; generating a neural network for room layout estimation, wherein the neural network comprises: an encoder-decoder sub-network configured to output predicted two-dimensional (2D) keypoints associated with a predicted room layout associated with each of the plurality of room types, and a side sub-network connected to the encoder-decoder network configured to output a predicted room type from the plurality of room types; and optimizing a loss function based on a first loss for the predicted 2D keypoints and a second loss for the predicted room type; and updating parameters of the neural network based on the optimized loss function.

In a 65th aspect, the method of aspect 64, wherein a number of the plurality of room types is greater than 5.

In a 66th aspect, the method of aspect 64 or aspect 65, wherein the reference keypoints and the predicted 2D keypoints are associated with a keypoint order.

In a 67th aspect, the method of any one of aspects 64 to 66, wherein a first keypoint order is associated with a first room type of the plurality of room types and a second keypoint order is associated with a second room type of the plurality of room types, wherein the first keypoint order and the second keypoint order are different.

In a 68th aspect, the method of any one of aspects 64 to 67, wherein the training room image comprises a monocular image.

In a 69th aspect, the method of any one of aspects 64 to 68, wherein the training room image comprises a Red-Green-Blue (RGB) image.

In a 70th aspect, the method of any one of aspects 64 to 69, wherein a dimensionality of the training room image is larger than a dimensionality of a map associated with the predicted 2D keypoints.

In a 71th aspect, the method of any one of aspects 64 to 70, wherein the encoder sub-network and the decoder sub-network comprises a plurality of recurrent layers.

In a 72th aspect, the method of aspect 71, wherein a number of recurrent iterations of the recurrent layers is two or three.

In a 73th aspect, the method of aspect 71 or aspect 72, wherein deep supervision is applied to the recurrent layers.

In a 74th aspect, the method of any one of aspects 71 to 73, wherein weights associated with a first recurrent iteration of the iterations of the recurrent layers are identical to weights associated with a second recurrent iteration of the current layers.

In a 75th aspect, the method of any one of aspects 71 to 74, wherein the plurality of recurrent layers are configured as a memory-augmented recurrent encoder-decoder (MRED) network.

In a 76th aspect, the method of any one of aspects 64 to 75, wherein the side sub-network comprises a room type classifier.

In a 77th aspect, the method of any one of aspects 64 to 76, wherein the first loss for the predicted 2D keypoints comprises a Euclidean loss between the plurality of reference keypoint locations and the predicted 2D keypoints.

In a 78th aspect, the method of any one of aspects 64 to 77, wherein the second loss for the predicted room type comprises a cross entropy loss.

In a 79th aspect, the method of any one of aspects 64 to 78, wherein the predicted 2D keypoints are extracted from a predicted heat map.

In an 80th aspect, the method of aspect 79, further comprising: calculating a reference heat map associated with the reference keypoints of the training image; and calculating the first loss for the predicted 2D keypoints based on a difference between the predicted heat map and the reference heat map.

In an 81st aspect, the method of aspect 80, wherein the reference heat map comprises a two-dimensional distribution centered at a location for each reference keypoint.

In an 82th aspect, the method of aspect 80 or aspect 81, wherein the reference heat map comprises a background away from the reference keypoints and a foreground associated with the reference keypoints, and the hardware processor is programmed to weight gradients in the reference heat map based on a ratio between the foreground and the background.

In an 83th aspect, the method of aspect 82, wherein weighting the gradients in the reference heat map comprises degrading values of pixels in the background by a degrading factor less than one.

In an 84th aspect, a method is disclosed. The method comprises: accessing a room image of an environment; analyzing the room image to determine a predicted layout of a room in the room image, comprising: using a neural network to determine an ordered set of two-dimensional (2D) keypoints associated with a room type for the room in the room image; and providing the room layout based at least partly on the 2D keypoints and the room type.

In an 85th aspect, the method of aspect 84, wherein the neural network comprises a convolutional encoder-decoder network.

In an 86th aspect, the method of aspect 85, wherein the convolutional encoder-decoder network comprises a memory-augmented recurrent encoder-decoder network.

In an 87th aspect, the method of any one of aspects 84 to 86, wherein the neural network comprises a classifier configured to determine the room type.

In an 88th aspect, the method of any one of aspects 84 to 87, further comprising extracting the ordered set of 2D keypoints from a heat map.

In an 89th aspect, the method of any one of aspects 84 to 88, further comprising: analyzing the room image to determine object information; and combining the object information with the room layout.

Additional Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task (e.g., performance of the RoomNet techniques) or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described herein may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A system comprising:
   non-transitory memory configured to store:
      an image of a room; and
      a neural network comprising:
         an encoder-decoder sub-network comprising an encoder and a decoder; and
         a classifier sub-network in communication with the encoder-decoder sub-network configured to classify a room type associated with the image;
   a hardware processor in communication with the non-transitory memory, the hardware processor programmed to:
      access the image;
      predict, using the encoder, decoder, and the image, two-dimensional (2D) keypoint maps corresponding to room types;
      determine, using the encoder, the classifier sub-network, and the image, a predicted room type from the room types; and
      determine a predicted layout of the room in the image based at least in part on the 2D keypoint maps and the predicted room type.

2. The system of claim 1, wherein each room type in the room types comprises a semantic segmentation for regions in the room type, the semantic segmentation comprising an identification as a floor, a ceiling, or a wall.

3. The system of claim 1, wherein a first keypoint order is associated with a first room type of the room types and a second keypoint order is associated with a second room type of the room types, wherein the first keypoint order and the second keypoint order are different.

4. The system of claim 1, wherein the encoder comprises a plurality of convolutional layers and a plurality of pooling layers, or the decoder comprises a plurality of convolutional layers and a plurality of upsampling layers.

5. The system of claim 1, wherein the encoder-decoder sub-network comprises a plurality of recurrent layers.

6. The system of claim 5, wherein a number of recurrent iterations of the plurality of recurrent layers is at least two.

7. The system of claim 1, wherein the predicted two-dimensional (2D) keypoint maps comprise heat maps.

8. The system of claim 7, wherein the hardware processor is programmed to extract keypoint locations from the heat maps as maxima of the heat map.

9. The system of claim 1, wherein the hardware processor is programmed to:
access object information from an object recognizer that analyzes the image; and
combine the object information with the predicted layout of the room.

10. The system of claim 9, wherein the object recognizer is configured to detect cuboids in the image.

11. A system comprising:
non-transitory memory configured to store parameters for the neural network; and
a hardware processor in communication with the non-transitory memory, the hardware processor programmed to:
receive an image, wherein the image is associated with:
a reference room type from a plurality of room types, and
reference keypoints associated with a reference room layout;
generate a neural network comprising:
an encoder-decoder sub-network configured to output two-dimensional (2D) keypoints associated with a predicted room layout, wherein the encoder-decoder sub-network comprises an encoder and a decoder, and
a side sub-network in communication with the encoder-decoder network configured to classify the reference room type associated with the image by outputting a predicted room type from the plurality of room types; and
update the parameters for the neural network based at least in part on an optimized loss function.

12. The system of claim 11, wherein a first keypoint order is associated with a first room type of the plurality of room types and a second keypoint order is associated with a second room type of the plurality of room types, wherein the first keypoint order and the second keypoint order are different.

13. The system of claim 11, wherein the encoder and the decoder comprise a plurality of recurrent layers.

14. The system of claim 11, wherein the optimized loss function is based at least in part on a first loss for the 2D keypoints and a second loss for the predicted room type.

15. The system of claim 11, wherein the 2D keypoints are extracted from a predicted heat map.

16. The system of claim 15, wherein hardware processor is programmed to:
calculate a reference heat map associated with the reference keypoints; and
calculate the first loss for the 2D keypoints based on a difference between the predicted heat map and the reference heat map.

17. A wearable display system comprising:
an outward-facing imaging system configured to obtain an image of an environment of the wearer of the wearable display system;
non-transitory memory configured to store the image; and
a hardware processor in communication with the non-transitory memory, the processor programmed to:
access the image; and
analyze the image to determine a predicted layout of a room in the image, wherein to analyze the image, the processor is programmed to:
use a neural network to determine two-dimensional (2D) keypoints associated with a room type associated with the image, wherein the neural network comprises:
an encoder-decoder sub-network configured to output the 2D keypoints, and
a side sub-network in communication with the encoder-decoder sub-network configured to classify a room type associated with the image by outputting the room type; and
provide the room layout based at least partly on the 2D keypoints and the room type.

18. The wearable display system of claim 17, wherein the neural network comprises a convolutional encoder-decoder network.

19. The wearable display system of claim 17, wherein the neural network comprises a classifier configured to determine the room type.

20. A method comprising:
accessing an image of a room;
predicting two-dimensional (2D) keypoint maps corresponding to room types based at least in part on the image;
determining a predicted room type from the room types based at least in part on the image and a side sub-network configured to classify a room type associated with the image; and
determining a predicted layout of the room in the image based at least in part on the 2D keypoint maps and the predicted room type.

21. The method of claim 20, wherein predicting 2D keypoint maps is also based at least in part on a neural network.

22. The method of claim 20, wherein the 2D keypoint maps are predicted based at least in part on one or more heat maps.

23. The method of claim 20, wherein each room type in the room types comprises a semantic segmentation for regions in the room type, the semantic segmentation comprising an identification as a floor, a ceiling, or a wall.

24. The method of claim 20, wherein a first keypoint order is associated with a first room type of the room types and a second keypoint order is associated with a second room type of the room types, wherein the first keypoint order and the second keypoint order are different.

* * * * *